(12) United States Patent
Abiko et al.

(10) Patent No.: US 10,102,413 B2
(45) Date of Patent: Oct. 16, 2018

(54) BIOMETRIC IMAGING DEVICE AND BIOMETRIC IMAGING METHOD

(71) Applicant: FUJITSU LIMITED, Kawasaki-shi, Kanagawa (JP)

(72) Inventors: Yukihiro Abiko, Kawasaki (JP); Soichi Hama, Atsugi (JP); Satoshi Maeda, Atsugi (JP); Satoshi Semba, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/139,690

(22) Filed: Apr. 27, 2016

(65) Prior Publication Data

US 2016/0328597 A1 Nov. 10, 2016

(30) Foreign Application Priority Data

May 8, 2015 (JP) .................................. 2015-095935

(51) Int. Cl.
*G06K 9/00* (2006.01)
*G06K 9/32* (2006.01)
(Continued)

(52) U.S. Cl.
CPC ......... *G06K 9/00033* (2013.01); *G06F 3/041* (2013.01); *G06F 3/04883* (2013.01); *G06K 9/00067* (2013.01); *G06K 9/3233* (2013.01); *H04N 5/2257* (2013.01); *G06F 2203/0338* (2013.01); *G06F 2203/04104* (2013.01);
(Continued)

(58) Field of Classification Search
CPC .......... G06K 9/00033; G06K 9/00067; G06K 9/3233; G06K 9/00026; G06K 9/0002; G06K 9/00013; G06K 9/00087; G06F 3/04883; G06F 3/041; G06F 2203/04104;
(Continued)

(56) References Cited

U.S. PATENT DOCUMENTS 7,359,534 B2 * 4/2008 Semba ............... G06K 9/00006
382/124
7,831,071 B2 * 11/2010 Monden ............. G06K 9/00026
340/5.53
(Continued)

FOREIGN PATENT DOCUMENTS

EP 1531419 A2 5/2005
EP 2830002 A2 1/2015
(Continued)

OTHER PUBLICATIONS

Vermesan, Ovidiu et al., "A 500-dpi AC Capacitive Hybrid Flip-Chip CMOS ASIC/Sensor Module for Fingerprint, Navigation, and Pointer Detection With On-Chip Data Processing", IEEE Journal of Solid-State Circuits, IEEE Service Center, Piscataway, NJ , USA, vol. 38, No. 12, Dec. 1, 2003, pp. 2288-2296.
(Continued)

*Primary Examiner* — Sheela C Chawan
(74) *Attorney, Agent, or Firm* — Fujitsu Patent Center

(57) ABSTRACT

A biometric imaging device includes a processor that outputs an instruction of an operation position on an input device, in response to detection of a first input to the input device, and a camera that captures a biometric image after the detection of the first input.

20 Claims, 21 Drawing Sheets

(51) Int. Cl.
*G06F 3/041* (2006.01)
*G06F 3/0488* (2013.01)
*H04N 5/225* (2006.01)

(52) U.S. Cl.
CPC .............. *G06F 2203/04808* (2013.01); *G06K 9/00026* (2013.01)

(58) Field of Classification Search
CPC .. G06F 2208/0338; G06F 2206/04808; H04N 5/2257
USPC ....... 382/124, 100, 115; 340/5.8, 5.81, 5.82; 704/200, 231, 246, 247
See application file for complete search history.

(56) References Cited

U.S. PATENT DOCUMENTS

| | | | | |
|---|---|---|---|---|
| 8,063,889 | B2* | 11/2011 | Anderson | G06F 3/04886 345/172 |
| 9,274,607 | B2* | 3/2016 | DeLean | G06F 3/017 |
| 9,430,066 | B2* | 8/2016 | Davidson | G06F 3/041 |
| 2002/0003892 | A1* | 1/2002 | Iwanaga | G06K 9/00026 382/124 |
| 2005/0185828 | A1 | 8/2005 | Semba et al. | |
| 2006/0214910 | A1* | 9/2006 | Mizuno | G06F 1/162 345/156 |
| 2008/0240523 | A1 | 10/2008 | Benkley et al. | |
| 2012/0218231 | A1* | 8/2012 | Slaby | G06F 3/04886 345/178 |
| 2012/0269406 | A1 | 10/2012 | Kraemer et al. | |
| 2014/0003683 | A1* | 1/2014 | Vieta | G06K 9/3208 382/124 |
| 2015/0103019 | A1* | 4/2015 | Young | A45F 5/00 345/173 |
| 2015/0242673 | A1* | 8/2015 | Singhal | G06K 9/00013 345/174 |

FOREIGN PATENT DOCUMENTS

| | | |
|---|---|---|
| JP | 2002-024831 | 1/2002 |
| JP | 2003-085540 | 3/2003 |
| JP | 2005-312749 | 11/2005 |
| JP | 2006-331239 | 12/2006 |
| JP | 2007-122164 | 5/2007 |
| WO | 00/16244 A1 | 3/2000 |
| WO | 2004/097741 | 11/2004 |

OTHER PUBLICATIONS

Extended European Search Report dated Aug. 8, 2016 for corresponding European Patent Application No. 16167223.3, 8 pages.
European Office Action dated Feb. 26, 2018 for corresponding European Patent Application No. 16167223.3, 6 pages.

* cited by examiner

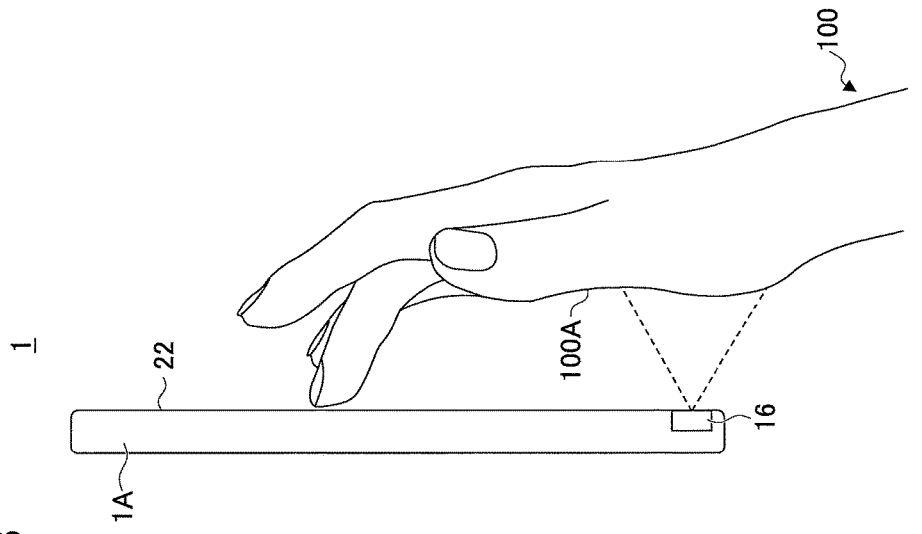
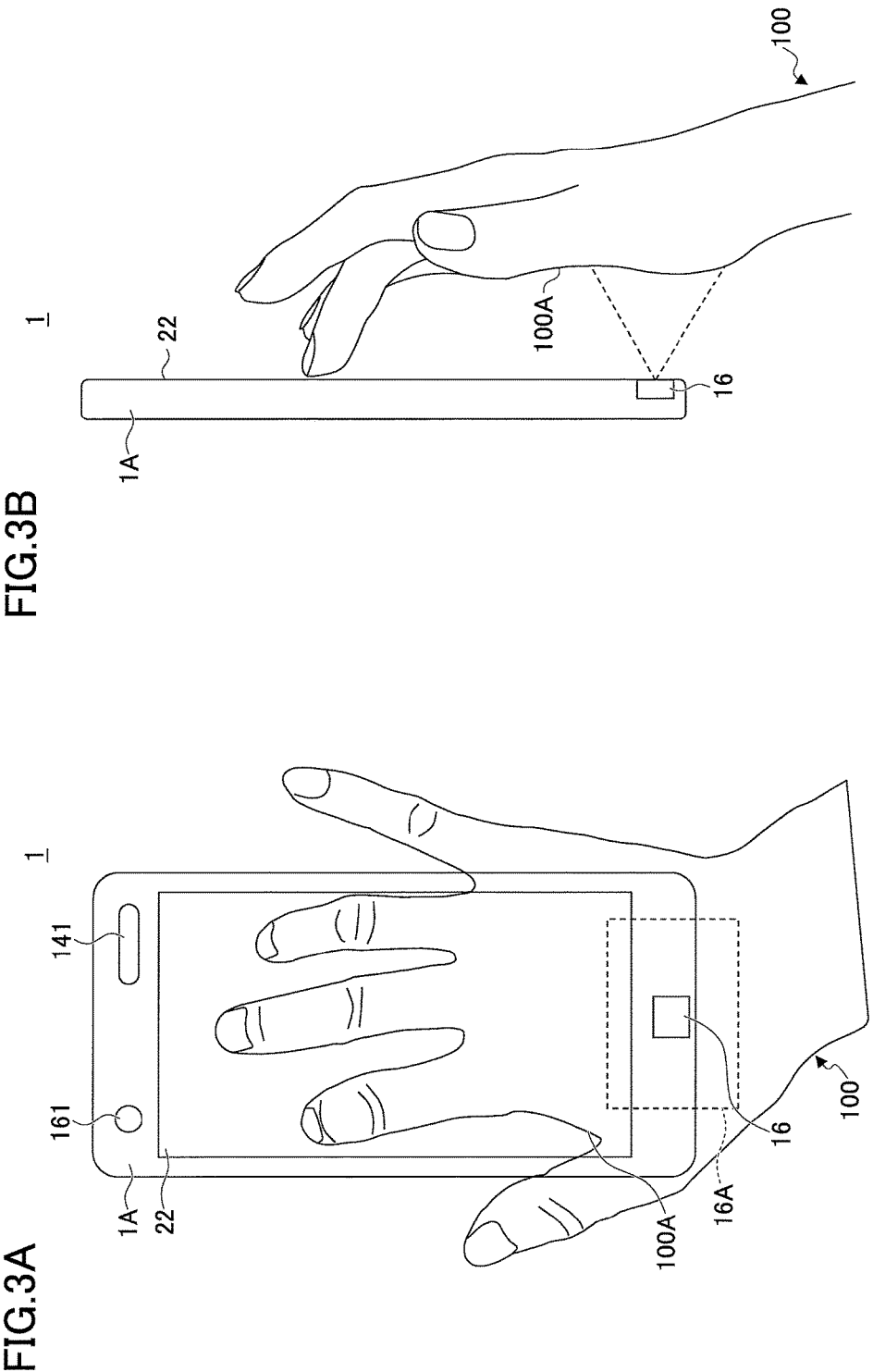

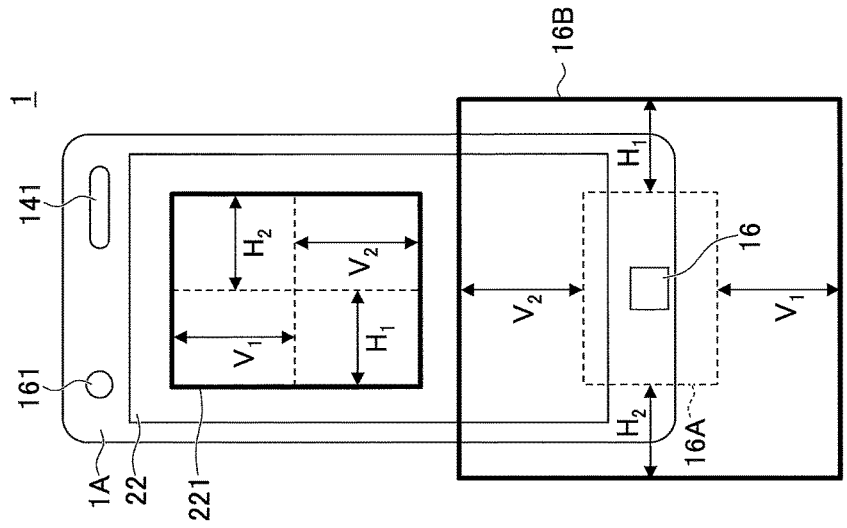
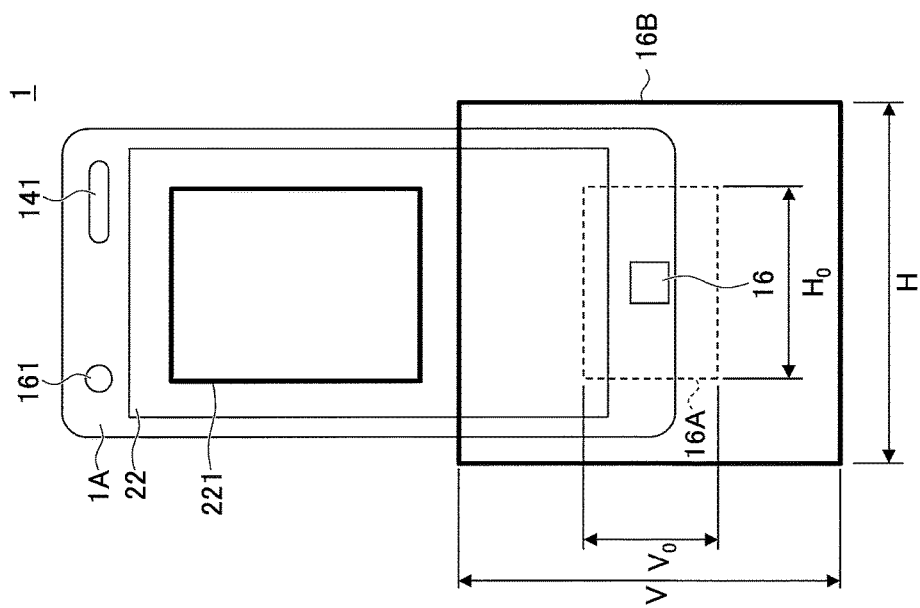

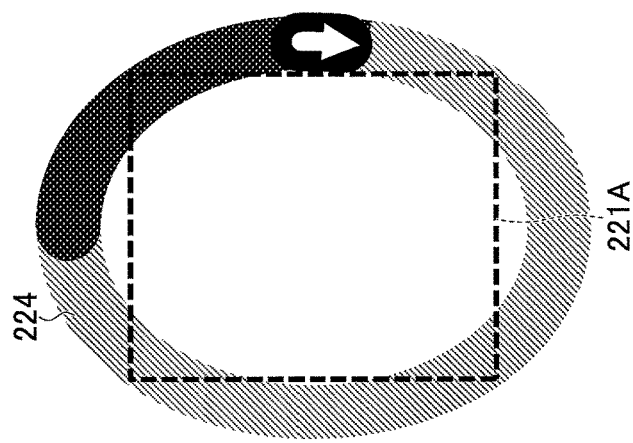
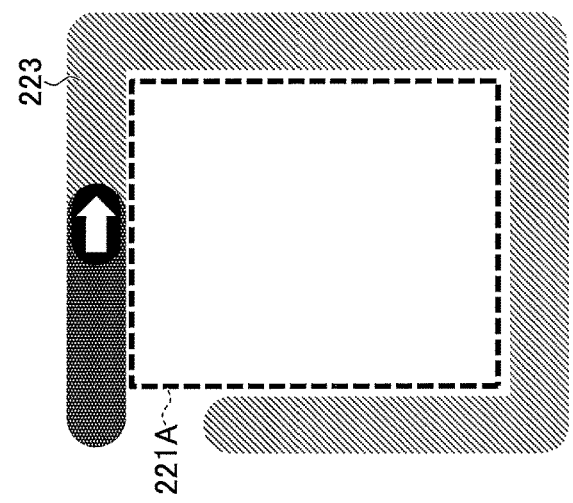
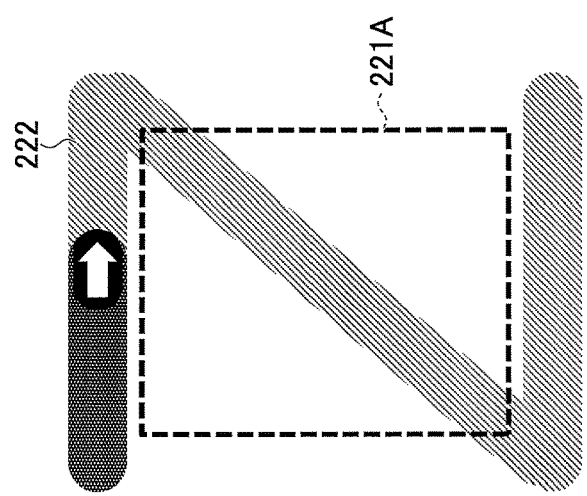

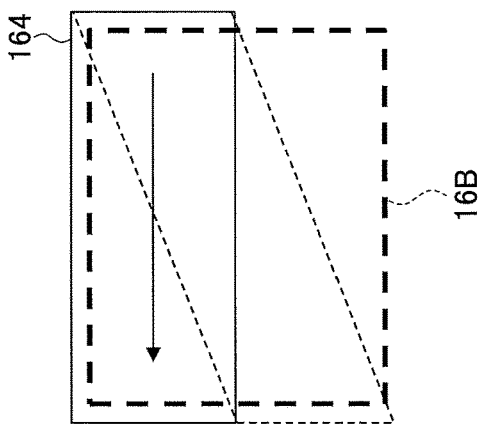
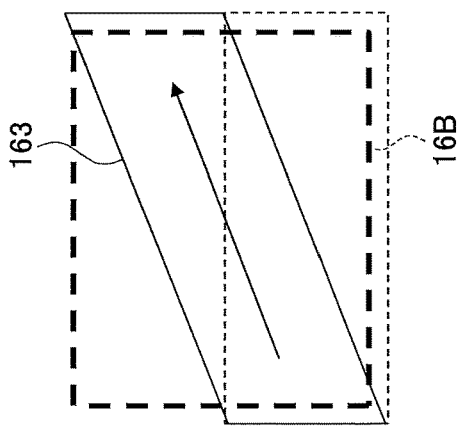
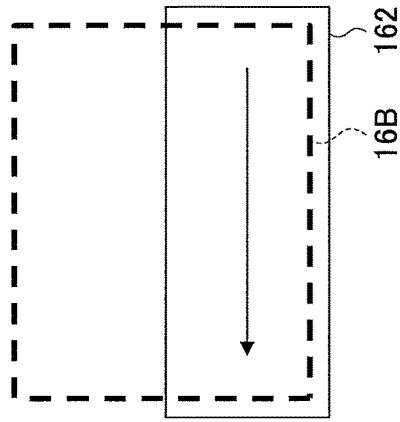

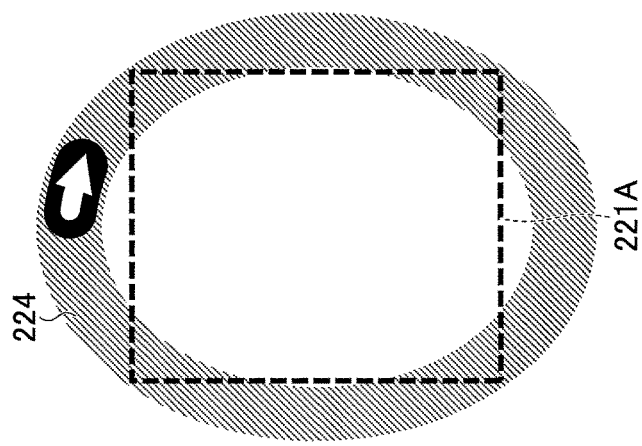
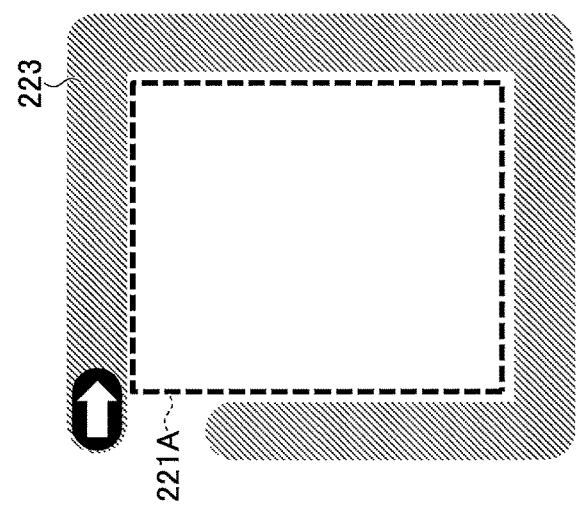
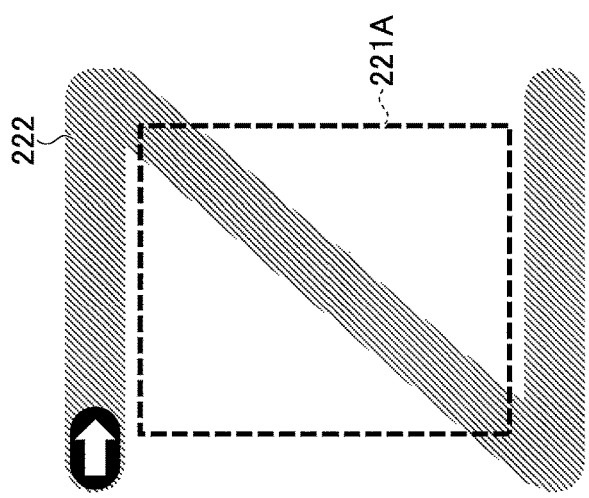

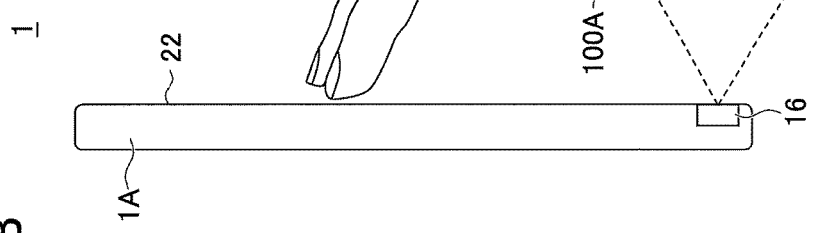
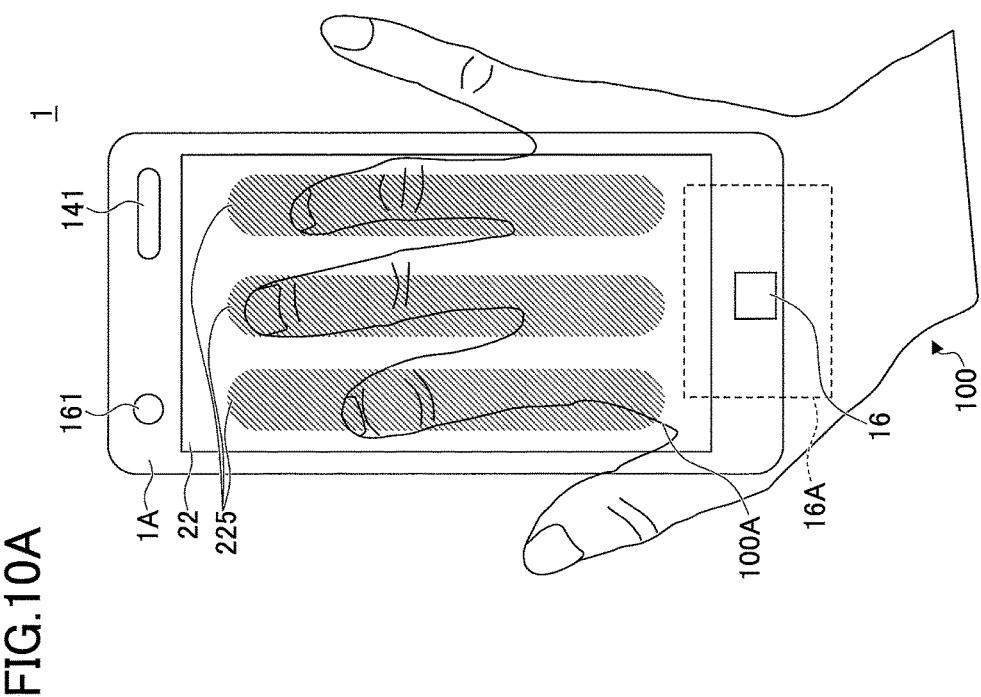

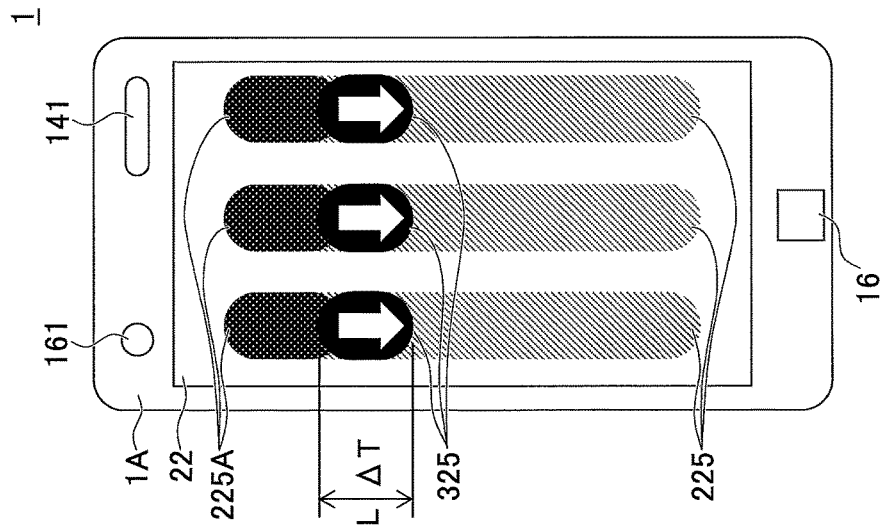
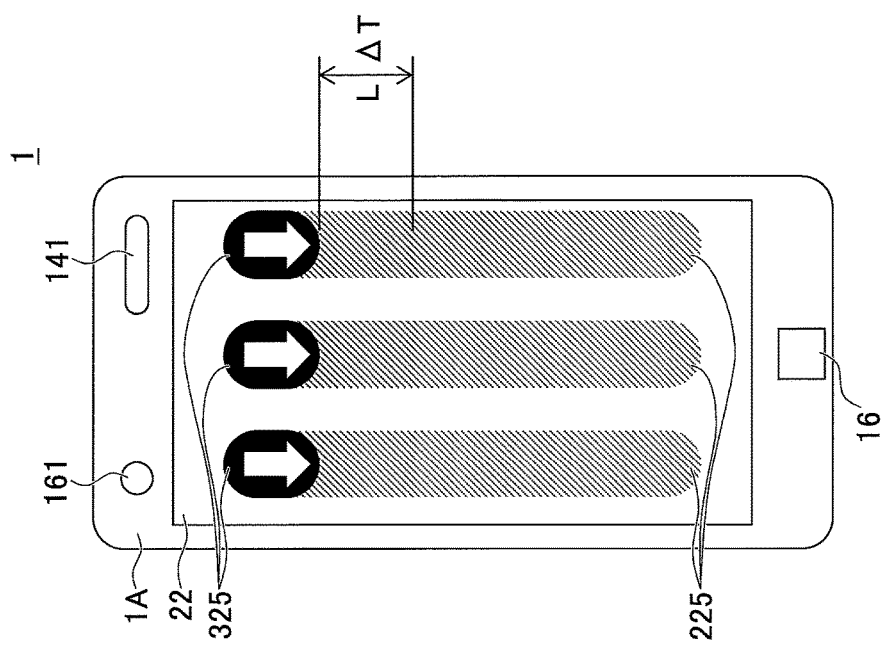

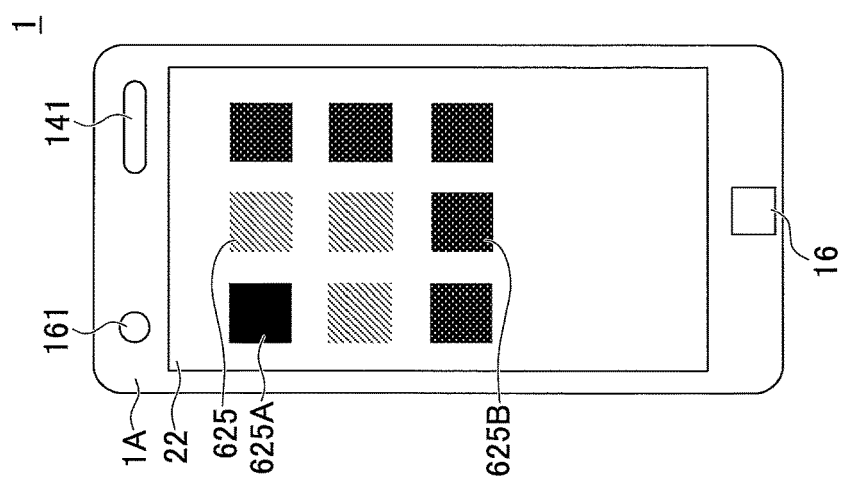
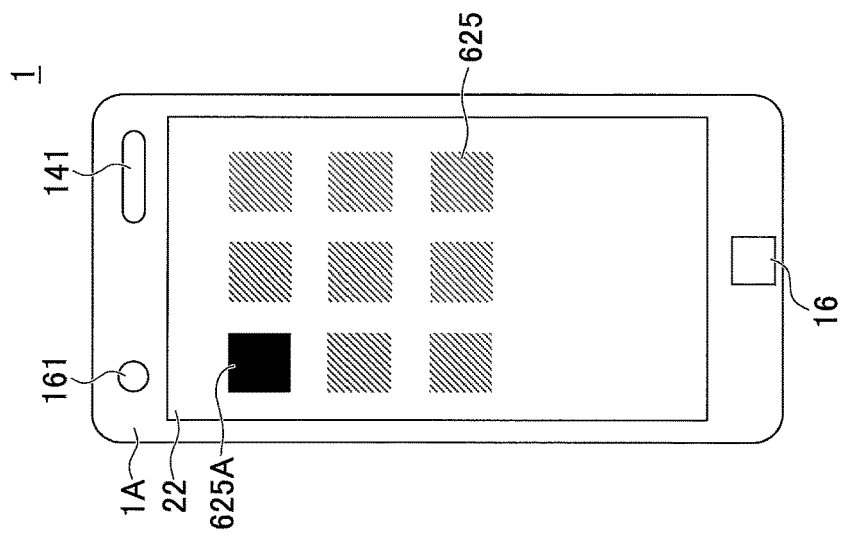
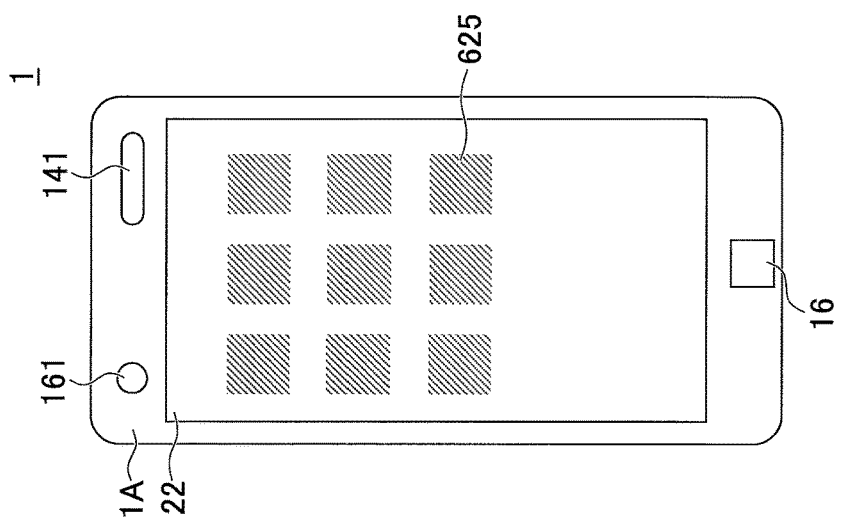

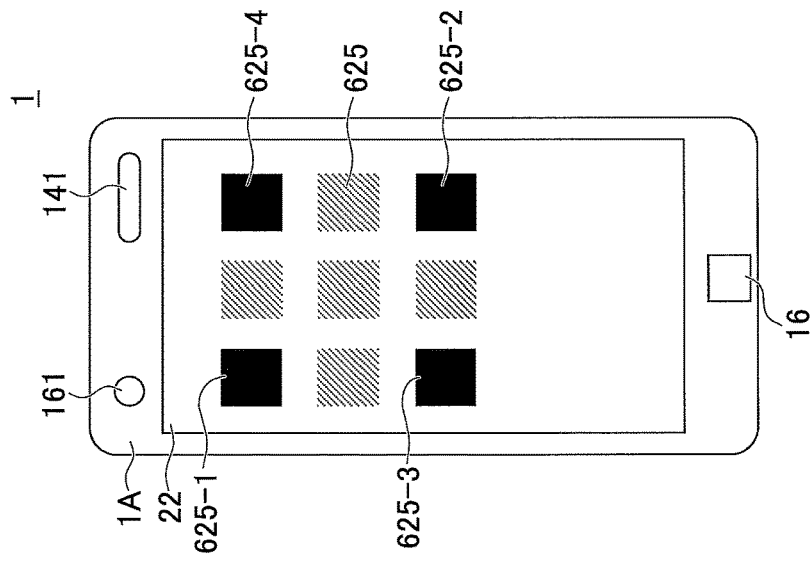
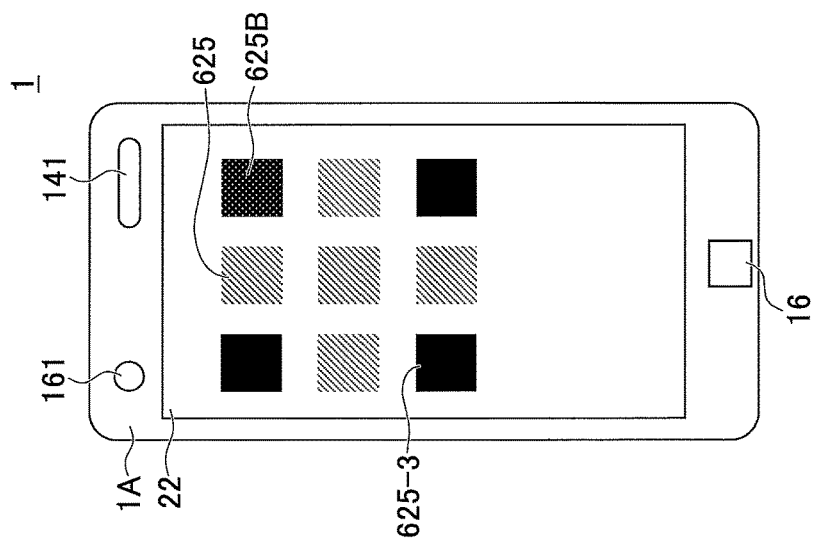
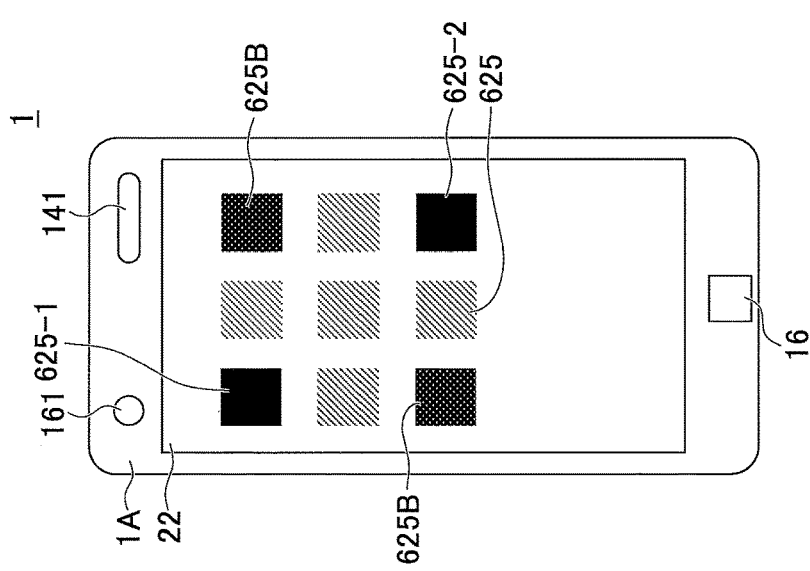

BIOMETRIC IMAGING DEVICE AND BIOMETRIC IMAGING METHOD

CROSS-REFERENCE TO RELATED APPLICATIONS

This application is based upon and claims the benefit of priority of the prior Japanese Patent Application No. 2015-095935, filed on May 8, 2015, the entire contents of which are incorporated herein by reference.

FIELD

The embodiments discussed herein are related to a biometric imaging device, a biometric imaging method, and a computer-readable storage medium having stored therein a biometric imaging program.

BACKGROUND

Recently, some mobile terminals, such as cell phones, are provided with a biometric authentication function. The mobile terminal provided with the biometric authentication function captures a biometric part by a camera provided on the mobile terminal, for example. However, depending on the size, specifications such as performance, or the like of the camera, there are cases in which the camera can capture only a portion of the biometric part that is used for the biometric authentication. For example, in the case of a compact mobile terminal provided with the biometric authentication function, such as a smartphone, the size of the camera that captures the biometric part is restricted, and an area of the biometric part that can be captured by one shot is small. It is difficult to capture the entire biometric part that is used for the biometric authentication by one shot.

When the biometric authentication is performed using the captured image of only a portion of the biometric part that is used for the biometric authentication, it is difficult to obtain a high authentication accuracy. One example of the biometric authentication includes a palm authentication that uses a vein pattern of the palm of a hand as the biometric part. When the palm authentication is performed using the captured image of only a portion of the palm, the authentication accuracy deteriorates compared to a case in which the captured image of the entire palm is used for the palm authentication.

Another example of the biometric authentication includes a fingerprint authentication that uses a fingerprint of a finger as the biometric part. For example, International Publication WO2004/097741 and Japanese Laid-Open Patent Publication No. 2002-024831 propose capturing the biometric part used for the fingerprint authentication a plurality of times, and performing the fingerprint authentication based on a large number of captured images. However, in this case, it is difficult to specify a suitable area of a registration template that is used for the fingerprint authentication to be matched to the large number of captured images of the fingerprint. In addition, in the case in which the biometric part such as the fingerprint is captured a plurality of times, the part of the biometric part that is captured each time may deviate according to habits, preference, or the like of the user of the mobile terminal. As a result, it is difficult to efficiently capture the biometric part that is suited for the biometric authentication. For this reason, even in the case in which the biometric part is captured a plurality of times, it is difficult to obtain a high authentication accuracy.

On the other hand, in the case in which the biometric part is captured by the camera of the mobile terminal, a capture area depends on the manner in which the user operates the mobile terminal. Hence, the area of the biometric part that is captured differs every time the biometric part is captured by the camera of the mobile terminal. In other words, different areas of the biometric part are captured when the biometric part is captured in a state in which the user holds the mobile terminal by the user's hand, and when the user moves the user's biometric part, such as the fingerprint, closer to the camera in a state in which the mobile terminal is placed on a desk, for example.

For this reason, in a case in which the capture area does not sufficiently capture the biometric part suited for the biometric authentication, for example, and the biometric authentication fails, the biometric part needs to be captured again, as proposed in Japanese Laid-Open Patent Publications No. 2003-085540 and No. 2007-122164, for example. When the biometric authentication fails and the biometric part needs to be captured again, the mobile terminal may urge the user to perform the capture operation again. However, it is difficult for the user to judge the capture area of the biometric part to be captured when performing the capture operation again. As a result, the number of times the biometric part needs to be captured again when the biometric authentication fails depends on the capture operation performed by the user, and the number of times may vary considerably. The convenience of the mobile terminal to the user deteriorates as the number of times the biometric part needs to be captured again increases. In addition, as the number of times the biometric part needs to be captured again increases, the probability of obtaining a successful biometric authentication may improve, however, there is no guarantee that the authentication accuracy will improve.

Hence, according to the mobile terminal provided with the conventional biometric authentication function, it is difficult to improve the accuracy of the biometric authentication.

Related art may include Japanese Laid-Open Patent Publications No. 2005-312749 and No. 2006-331239, for example.

SUMMARY

Accordingly, it is an object in one aspect of the embodiments to provide a biometric imaging device, a biometric imaging method, and a computer-readable storage medium, that can improve the accuracy of the biometric authentication.

According to one aspect of the embodiments, a biometric imaging device includes a processor that outputs an instruction of an operation position on an input device, in response to detection of a first input to the input device, and a camera that captures a biometric image after the detection of the first input.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are diagrams for explaining an example of an operation of the terminal apparatus in one embodiment;

FIGS. 4A and 4B are diagrams for explaining an example of enlarging a capture area;

FIGS. 6A, 6B, and 6C are diagrams illustrating examples of touch locations displayed on a touchscreen panel;

FIGS. 7A, 7B, and 7C are diagrams for explaining the capture area for a case in which a user traces a Z-shaped touch location by a fingertip;

FIGS. 8A, 8B, and 8C are diagrams illustrating examples of displays of an input standby state of the terminal apparatus;

FIGS. 10A and 10B are diagrams for explaining a first example of the touch location;

FIGS. 11A and 11B are diagrams for explaining a second example of the touch location;

FIGS. 20A, 20B, and 20C are diagrams for explaining operation states of the terminal apparatus illustrated in FIG. 19; and FIGS. 21A, 21B, and 21C are diagrams for explaining an example of the operation of the terminal apparatus illustrated in FIG. 19.

DESCRIPTION OF EMBODIMENTS

Preferred embodiments of the present invention will be described with reference to the accompanying drawings.

A description will now be given of the biometric imaging device, the biometric imaging method, and the computer-readable storage medium in each embodiment according to the present invention.

The biometric authentication technique verifies the identity of a user using biometric information having features that differ for each individual, such as a fingerprint, a face, a palm of the hand, an iris, a vein pattern, or the like. For example, the palm authentication performs the biometric authentication using biometric information such as a palmprint, a palm-shape, the vein pattern of the palm, or the like. In the following description, the palm authentication is described as one example of the biometric authentication, however, the biometric authentication is of course not limited to the palm authentication.

In one embodiment, a biometric imaging device and a biometric authentication apparatus described hereunder may be mounted on a terminal apparatus. The terminal apparatus may be a mobile terminal. Accordingly, examples of the terminal apparatus include a personal computer, a tablet, a smartphone, or the like. In addition, the biometric imaging device may be included in the biometric authentication apparatus.

Figure 1:
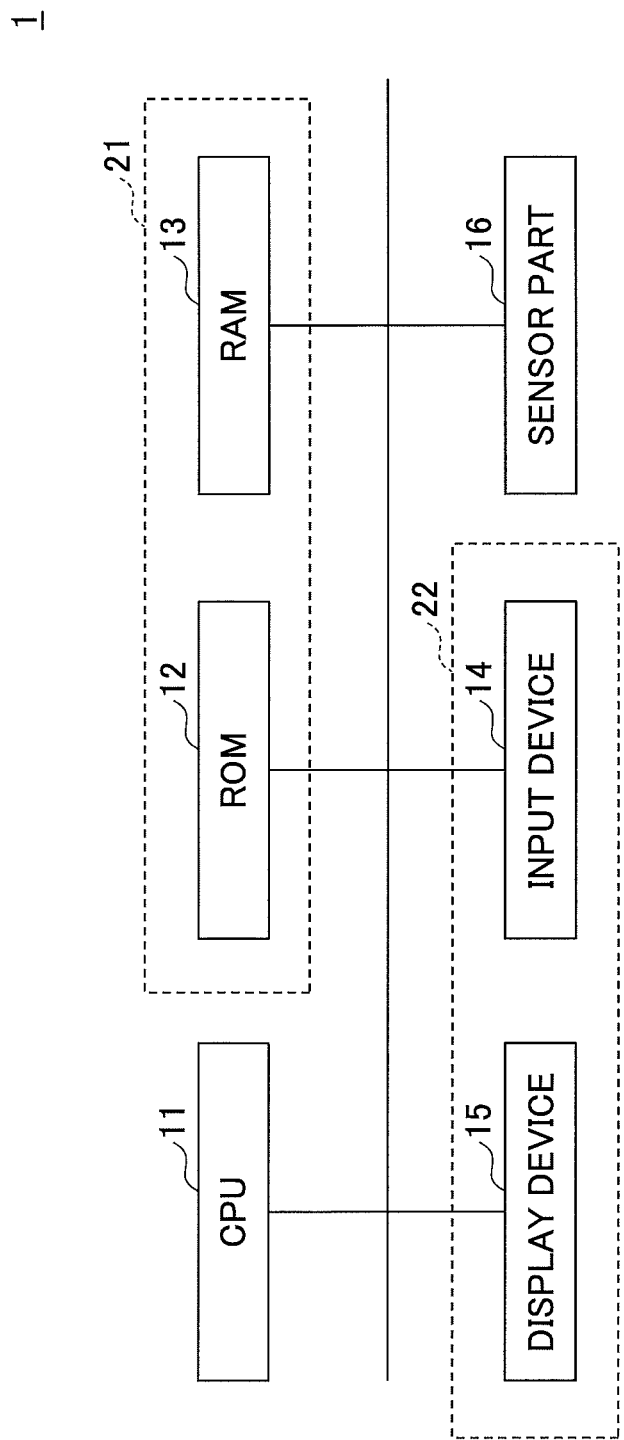
FIG. 1 is a block diagram illustrating an example of a hardware configuration of a terminal apparatus in one embodiment.

FIG. 1 is a block diagram illustrating an example of a hardware configuration of the terminal apparatus in one embodiment. In this example, a terminal apparatus 1 may be a mobile terminal, such as the tablet, the smartphone, or the like. The terminal apparatus 1 includes a CPU (Central Processing Unit) 11, a ROM (Read Only Memory) 12, a RAM (Random Access Memory) 13, an input device 14, a display device 15, and a sensor part 16 that are connected as illustrated in FIG. 1. In a case in which the terminal apparatus 1 includes a communication function, the terminal apparatus 1 may further include a known communication unit (not illustrated) for making a transmission and a reception. In addition, in a case in which the terminal 1 includes a function to connect to an external network (not illustrated), such as the Internet, for example, the terminal apparatus 1 may further include a known interface (not illustrated).

The CPU 11 is an example of a control unit (or processor, or computer) that controls the entire terminal apparatus 1. Accordingly, the control unit also controls the biometric imaging device and the biometric authentication apparatus. The ROM 12 and the RAM 13 form a storage device 21 that is an example of a storage unit. The input device 14 and the display device 15 form an example of an operation unit. In this example, the input device 14 and the display device 15 are included in a touchscreen panel 22 that forms an example of the operation unit. The sensor part 16 is an example of a biometric capturing unit.

The CPU 11 can execute computer programs, including a biometric imaging program, stored in the ROM 12, to perform various functions of the terminal apparatus 1 including the biometric imaging device and the biometric authentication apparatus. The ROM 12 stores the computer programs executed by the CPU 11, various data, or the like. The ROM 12 is an example of a non-transitory computer-readable storage medium having stored therein the computer programs. The RAM 13 stores one or more registration templates, in addition to various data.

The input device 14 has a function to convert an electrical signal that is based on a position on the input device 14 touched by the user's finger to operate the input device, into digital information, and inputting the digital information to the CPU 11. The input device 14 also has a function to input to the CPU 11 information including a coordinate of the position touched by the user, a character represented by the position touched by the user, or the like. In other words, the input device 14 (or the touchscreen panel 22) is an example of a detection unit that detects an input to the touchscreen panel 22 that is an example of the operation unit. The display device 15 has a function to display characters, images, messages, or the like. As will be described later, the display device 15 also has a function to display a touch location including an input position, a moving direction, and an operation position on the input device 14, a move instruction to move the touch location, or the like.

The sensor part 16 has a function to capture a biometric part. The sensor part 16 may be a contact type that captures the biometric image by making contact with the biometric part, or a noncontact type that captures the biometric image by making no contact with the biometric part. In a case in which the sensor part 16 is the contact type, it is possible to utilize a touchscreen panel having a built-in fingerprint sensor in which the input device 14, the display device 15, and the sensor part 16 are integrated. On the other hand, in a case in which the sensor part 16 is the noncontact type, the sensor part 16 includes at least a camera, and may further include a biometric illuminating light source. In this example, the sensor part 16 is provided on the same side as the touchscreen panel 22 of the terminal apparatus 1, at a position in a periphery of the touchscreen panel 22.

The sensor part 16 may be formed by a camera that captures the palm-print or palm-shape of the hand, the face, or the like. In addition, the sensor part 16 may be formed by a near-infrared sensor (or near-infrared camera) including an image sensor (or camera) having sensitivity in an infrared wavelength region for capturing the vein of the palm, the vein of the finger, the iris, or the like, for example, and a near-infrared light illuminating light source. Further, the sensor part 16 may include both a camera having sensitivity in a wavelength region other than the near-infrared wavelength region, and a near-infrared sensor.

In this example, the touchscreen panel 22 includes the functions of both the input device 14 and the display device 15. However, the operation unit is not limited to the touchscreen panel 22, and devices such as a track pad, a keyboard, a digitizer, or the like may be used for the operation unit.

Figure 2:
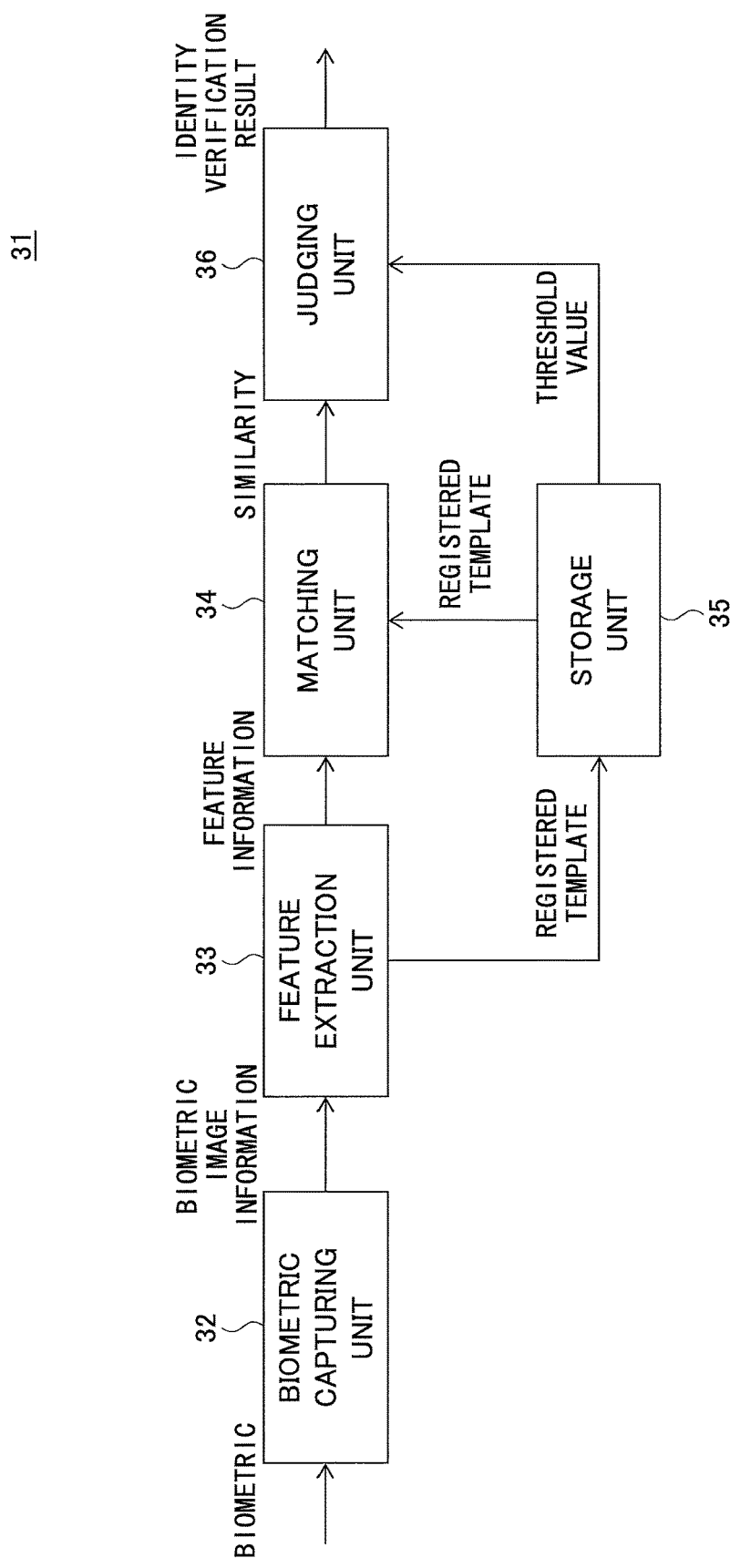
FIG. 2 is a functional block diagram illustrating an example of a configuration of a biometric authentication apparatus in one embodiment.

FIG. 2 is a functional block diagram illustrating an example of a configuration of the biometric authentication apparatus in one embodiment. A biometric authentication apparatus 31 illustrated in FIG. 2 includes a biometric capturing unit 32, a feature extraction unit 33, a matching unit 34, a storage unit 35, and a judging unit 36. The biometric capturing unit 32 may be formed by the sensor part 16 illustrated in FIG. 1, for example. The feature extraction unit 33, the matching unit 34, and the judging unit 36 may be formed by the CPU 11 illustrated in FIG. 1, for example, and may be included in the control unit that is formed by the CPU 11, for example. The storage unit 35 may be formed by the storage device 21 illustrated in FIG. 1, for example.

In a biometric authentication process performed by the biometric authentication apparatus 31, the matching unit 34 compares feature information registered in advance in the storage unit 35 to feature information extracted by the feature extraction unit 33, to determine a similarity between the two compared feature information. The feature extraction unit 33 extracts the feature information from biometric image information of the user captured by the biometric capturing unit 32 at the time of verifying the identity of the user. The judging unit 35 judges whether the result of matching by the matching unit 34, that is, the similarity, indicates that the two compared feature information match within a predetermined range of a threshold value that may be supplied from the storage unit 35. The judging unit 35 outputs an identity verification result that verifies the identity of the user in a case in which the two compared feature information match within the predetermined range of the threshold value in the matching unit 34.

The feature information that is registered in advance may be referred to as the registration template, for example. In a registration process of the registration template, the feature extraction unit 33 extracts the feature information from the biometric image information of the user captured by the biometric capturing unit 32, similarly as in the case of the biometric authentication process described above. In addition, the registration template is registered by supplying the extracted feature information to the storage unit 35. The registration template registered in the storage unit 35 may be feature information that is subjected to a process before being registered.

In the example illustrated in FIG. 2, the storage unit 35 is provided within the biometric authentication apparatus 31. However, a part of the stored contents of the storage unit 35, or the entire stored contents of the storage unit 35, may be stored in a storage unit provided externally to the biometric authentication apparatus 31. For example, an HDD (Hard Disk Drive), a flash memory, or the like that is an example of the storage unit 35 may be externally connected to the biometric authentication apparatus 31 via an interface, such as an USB (Universal Serial Bus), or the like. In addition, the storage unit 35 may form a database that is connectable to the biometric authentication apparatus 31 via a network (not illustrated).

FIGS. 3A and 3B are diagrams for explaining an example of an operation of the terminal apparatus in one embodiment. FIG. 3A illustrates a plan view of the terminal apparatus 1 operated by a user 100, and FIG. 3B illustrates a side view of the terminal apparatus 1 operated by the user 100. In this example, the terminal apparatus 1 has the touchscreen panel 22 provided on a top surface of a casing 1A that has a generally rectangular shape in the plan view. The sensor part 16 is provided at a lower position of the touchscreen panel 22, that is an example of a peripheral position of the touchscreen panel 22. In other words, in a case in which the user 100 operates the terminal apparatus 1 that is in a vertically long posture by touching an input position on the touchscreen panel 22 by the user's fingertip, the sensor part 16 can capture a palm 100A of the user 100. The sensor part 16 is arranged at a position on the same top surface of the casing 10A provided with the touchscreen panel 22. A capture area (or region) 16A of the palm 100A captured by the sensor part 16, surrounded by a dotted line in FIG. 3A, is determined by a camera angle of view of the sensor part 16, a distance between the sensor part 16 and the palm 100A, or the like. For this reason, the capture area 16A of the sensor part 16 corresponds to a portion of the palm 100A.

In the example illustrated in FIGS. 3A and 3B, another sensor part (or camera) 161, and a microphone 141 that is an example of the input device 14, are provided at the peripheral position of the touchscreen panel 22, in addition to the sensor part 16. In this example, the other sensor part 161 and the microphone 141 are provided at upper positions on the top surface of the casing 1A, that is, at positions different from that of the sensor part 16. At least one of the other sensor part 161 and the microphone 141 may be provided on the top surface of the casing 1A on the same side (for example, lower position) as the sensor part 16.

FIGS. 4A and 4B are diagrams for explaining an example of enlarging the capture area. FIG. 4A is a plan view illustrating a relationship between an input area (or region) 221 on the touchscreen panel 22 and the capture area 16A of the sensor part 16. FIG. 4B is a plan view illustrating a change in the capture area 16A according to the input position on the touchscreen panel 22. In a case in which the user 100 touches a center position within the input area 221 indicated by a bold solid line on the touchscreen panel 22 illustrated in FIG. 4A by the user's fingertip, the capture area 16A of the sensor part 16 captures an area within an enlarged capture area 16B indicated by a bold solid line. In this example, the capture area 16A of the sensor part 16 has a rectangular shape having a height $V_0$ and a width $H_0$, however, the capture area 16A may have a square shape, for example.

When the user 100 moves the user's fingertip from the touch position at the center position within the input area 221 in upward, downward, leftward, and rightward direction in FIG. 4B, the capture area 16A of the sensor part 16 can capture the palm 100A within the enlarged capture area 16B having a height V and a width H. Because the arrangement of the touchscreen panel 22 and the sensor part 16 (that is, the position of the sensor part 16 with respect to the touchscreen panel 22) on the casing 1A is known, in a case in which the distance between the sensor part 16 and the palm 100A is approximately constant, an area of the palm 100A within the capture area 16A of the sensor part 16 can be determined from the position on the touchscreen panel 22 touched by the fingertip of the user 100.

For this reason, as illustrated in FIG. 4B, when the user 100 moves the user's fingertip in the upward direction by a distance $V_1$ along a height direction with respect to the center position within the input area 221 on the touchscreen panel 22, the capture area 16A of the sensor part 16 is enlarged in the downward direction by the distance $V_1$ along the height direction. Similarly, when the user 100 moves the user's fingertip in the downward direction by a distance $V_2$ along the height direction with respect to the center position within the input area 221 on the touchscreen panel 22, the capture area 16A of the sensor part 16 is enlarged in the upward direction by the distance $V_2$ along the height direction. In addition, when the user 100 moves the user's fingertip in the leftward direction by a distance $H_1$ along a width direction with respect to the center position within the input area 221 on the touchscreen panel 22, the capture area 16A of the sensor part 16 is enlarged in the rightward direction by the distance $H_1$ along the width direction. Moreover, when the user 100 moves the user's fingertip in the rightward direction by a distance $H_2$ along the width direction with respect to the center position within the input area 221 on the touchscreen panel 22, the capture area 16A of the sensor part 16 is enlarged in the leftward direction by the distance $H_2$ along the width direction. Accordingly, when the user 100 moves the user's fingertip from the touch position at the center position within the input area 221 in the upward, downward, leftward, and rightward directions in FIG. 4B, the capture area 16A of the sensor part 16 can be enlarged to the rectangular enlarged capture area 16B having a maximum height of $V_0+V_1+V_2$ and a maximum width of $H_0+H_1+H_2$.

Figure 5:
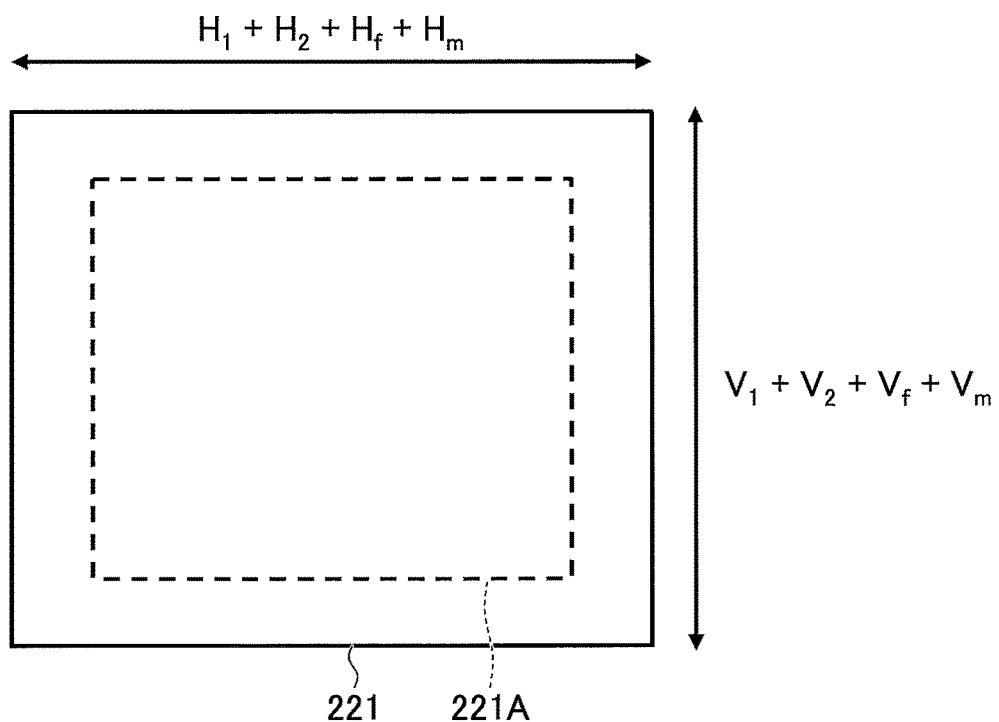
FIG. 5 is a diagram for explaining another example of enlarging the capture area.

FIG. 5 is a diagram for explaining another example of enlarging the capture area. For the sake of convenience, FIG. 5 illustrates only the input area 221 on the touchscreen panel.

Generally, when the user 100 touches the input position on the touchscreen panel 22 by the user's fingertip, an offset is generated between the input position on the touchscreen panel 22 viewed by the eyes of the user 100 and the touch position on the touchscreen panel 22 actually touched by the fingertip of the user 100. Hence, the height of the input area 221 on the touchscreen panel 22 may be set to $V_1+V_2+V_f$ by taking into consideration an offset $V_f$ in the height direction, and the width of the input area 221 on the touchscreen panel 22 may be set to $H_1+H_2+H_f$ by taking into consideration an offset $H_f$ in the width direction. In this case, the capture area 16A of the sensor part 16 can be enlarged to the rectangular enlarged capture area 16B having a maximum height of $V_0+V_1+V_2+V_f$ and a maximum width of $H_0+H_1+H_2+H_f$.

Further, in a case in which the user 100 is skilled in the operation on the touchscreen panel 22 and the user 100 touches inside the input area 221 displayed on the touchscreen panel 22 by the user's fingertip, it may be assumed that the actual touch position falls inside the input area on the touchscreen panel 22. Hence, the height of the input area 221 on the touchscreen panel 22 may be set to $V_1+V_2+V_m$ by taking into consideration a margin $V_m$ in the height direction between an outer peripheral edge of the input area 221 and the touch position within the input area 221 on the touchscreen panel 22 actually touched by the fingertip of the user 100. In addition, the width of the input area 221 on the touchscreen panel 22 may be set to $H_1+H_2+H_m$ by taking into consideration a margin $H_m$ in the width direction between the outer peripheral edge of the input area 221 and the touch position within the input area 221 on the touchscreen panel 22 actually touched by the fingertip of the user 100. In this case, the capture area 16A of the sensor part 16 can be enlarged to the rectangular enlarged capture area 16B having a maximum height of $V_0+V_1+V_2+V_m$ and a maximum width of $H_0+H_1+H_2+H_m$.

FIG. 5 illustrates the input area 221 on the touchscreen panel 22 for a case in which both the offsets $V_f$ and $H_f$ in the height and width directions, and the margins $V_m$ and $H_m$ in the height and width directions are taken into consideration. In this case, as surrounded by a bold solid line, the height of the input area 221 is set to $V_1+V_2+V_m+V_f$, and the width of the input area 221 is set to $H_1+H_2+H_m+H_f$. In FIG. 5, an area 221A surrounded by a bold dotted line indicates a minimum area of the assumed touch position when the user 100 touches the touchscreen panel 22 by the user's fingertip. In other words, by setting the input area 221 by additionally taking into consideration the margins $V_m$ and $H_m$ and the offsets $V_f$ and $H_f$, it is possible to capture the enlarged capture area 16B having a height of at least $V_0+V_1+V_2$, and a width of at least $H_0+H_1+H_2$.

Next, a description will be given of touch locations displayed on the touchscreen panel, by referring to FIGS. 6A, 6B, and 6C. FIGS. 6A, 6B, and 6C are diagrams illustrating examples of the touch locations displayed on the touchscreen panel. The display of the touch location on the touchscreen panel 22 may be controlled by the CPU 11 forming an example of the control unit.

FIG. 6A illustrates an example that displays a Z-shaped touch location 222 on the touchscreen panel 22 with respect to the area 221A. FIG. 6B illustrates an example that displays an approximate rectangular shaped touch location 223 on the touchscreen panel 22 with respect to the area 221A. FIG. 6C illustrates an example that displays an approximate circular touch location 224 on the touchscreen panel 22 with respect to the area 221A. In FIGS. 6A through 6C, thin-shaded hatchings indicate the touch locations 222, 223, and 224 that are displayed, dark hatchings indicate touch locations that are already touched and input by the fingertip of the user 100, and outline (or white) arrows indicate a current input position and a moving direction of the fingertip of the user 100. The touch locations 222, 223, and 224 are examples of instructions of operation positions on the operation unit, and may be examples of a move instruction to move the touch location. In other words, the operation position on the operation unit is an instruction (or guide) to guide the operation of the user 100. In addition, the touch location on the operation unit provides to the user 100 the move instruction (or move guidance) to move the touch location, such as a moving route including the operation position on the operation unit.

Accordingly, in the examples illustrated in FIGS. 6A through 6C, the portion represented by the dark hatchings indicates the operation position that is already input and for which a first input has been detected, the outline (or white) arrow indicates the input direction, and the portion represented by the thin-shaded hatchings indicates the operation position instructing a second input to the user 100. In these examples, in a state prior to being touched by the fingertip of the user 100, each of the touch locations 222, 223, and 224 is displayed by the thin-shaded hatchings to indicate the entire range of the operation position instructing input to the user 100. For this reason, when the user 100 touches each of the touch locations 222, 223, and 224 by the user's fingertip and slides the fingertip (hereinafter also referred to as making a "sliding instruction"), the operation position instructing input and indicated by the thin-shaded hatchings on the touchscreen panel 22 successively changes to the operation position that is already input and indicated by the dark hatchings. In other words, the traced portion of the operation position indicated by the thin-shaded hatchings on the touchscreen panel 22, traced by the fingertip of the user 100, changes to the operation position that is already input and indicated by the dark hatchings. In addition, when the user 100 performs the sliding instruction with respect to any of the touch locations 222, 223, and 224 by the user's fingertip, the capture area 16A of the sensor part 16 with respect to the palm 100A of the user 100 operating the touchscreen panel 22 is enlarged to the enlarged capture area 16B.

In a state in which the user 100 touches each of the touch locations 222, 223, and 224 by the user's fingertip, only the operation position instructing the first input to the user may be displayed in the portion indicated by the thin-shaded hatchings. In this case, when the user 100 touches the operation position instructing the first input at one of the touch locations 222, 223, and 224 by the user's fingertip, the touched operation position changes to the operation position that is already input and is indicated by the dark hatchings, and the operation position instructing the second input to the user 100 is displayed by the portion indicated by the thin-shaded hatchings. Similarly, when the user 100 touches the operation position instructing the second input at one of the touch locations 222, 223, and 224 by the user's fingertip, the touched operation position changes to the operation position that is already input and is indicated by the dark hatchings, and the operation position instructing a third input to the user 100 is displayed by the portion indicated by the thin-shaded hatchings. Hence, the display on the touchscreen panel 22 may be changed from a first touch location to a second location, after displaying the first touch location.

FIGS. 7A, 7B, and 7C are diagrams for explaining the capture area for a case in which the user traces a Z-shaped touch location by the fingertip. FIG. 7A illustrates a capture area 162 of the enlarged capture area 16B captured in a direction of an arrow by the sensor part 16, in a case in which the user 100 traces from an upper left portion to an upper right portion of the Z-shaped touch location 222 illustrated in FIG. 6A by the user's fingertip. FIG. 7B illustrates a capture area 163 of the enlarged capture area 16B captured in a direction of an arrow by the sensor part 16, in a case in which the user 100 traces from the upper right portion to a lower left portion of the Z-shaped touch location 222 illustrated in FIG. 6A from right by the user's fingertip. FIG. 7C illustrates a capture area 164 of the enlarged capture area 16B captured in a direction of an arrow by the sensor part 16, in a case in which the user 100 traces from the lower left portion to a lower right portion of the Z-shaped touch location 222 illustrated in FIG. 6A by the user's fingertip.

Accordingly, when the user makes the sliding instruction with respect to the touch location on the touchscreen panel 22 by the user's fingertip, the sensor part 16 enlarges the capture area 16A to the enlarged capture area 16B with respect to the palm 100A of the user. For this reason, the sensor part 16 can capture the palm 100A by the enlarged capture area 16B that is larger than the capture area 16A.

FIGS. 8A, 8B, and 8C are diagrams illustrating examples of displays of an input standby state of the terminal apparatus. In FIGS. 8A through 8C, those parts that are the same as those corresponding parts in FIGS. 6A through 6C are designated by the same reference numerals, and a description thereof will be omitted. FIG. 8A illustrates a case in which the Z-shaped touch location 222 is displayed on the touchscreen panel 22 with respect to the area 221A as illustrated in FIG. 6A, in the input standby state of the terminal apparatus 1. Similarly, FIG. 8B illustrates a case in which the approximately rectangular shaped touch location 223 is displayed on the touchscreen panel 22 with respect to the area 221A as illustrated in FIG. 6B, in the input standby state of the terminal apparatus 1. In addition, FIG. 8C illustrates a case in which the approximately oval-shaped touch location 224 is displayed on the touchscreen panel 22 with respect to the area 221A as illustrated in FIG. 6C, in the input standby state of the terminal apparatus 1. In the input standby state of the terminal apparatus 1, at least the operation position instructing the first input and the input direction (or moving direction) are displayed. When the user 100 touches the operation position instructing the first input by the user's fingertip, a least the operation position instructing the second input is displayed. In the examples illustrated in FIGS. 8A through 8C, all of the range of the operation position instructing the input and the input direction, including the operation positions instructing the first input and the second input, is displayed. In the examples illustrated in FIGS. 8A through 8C, the input direction is indicated by the outline (or white) arrow, however, the actual display is not limited to such an arrow.

The move instruction, such as the touch locations 222, 223, and 224 displayed on the touchscreen panel 22, may be instructed by at least one of a linear, a Z-shaped, an approximate rectangular, an approximate circular or oval-shaped, and an approximate triangular shaped sliding movement by at least one finger on the touchscreen panel 22.

Figure 9:
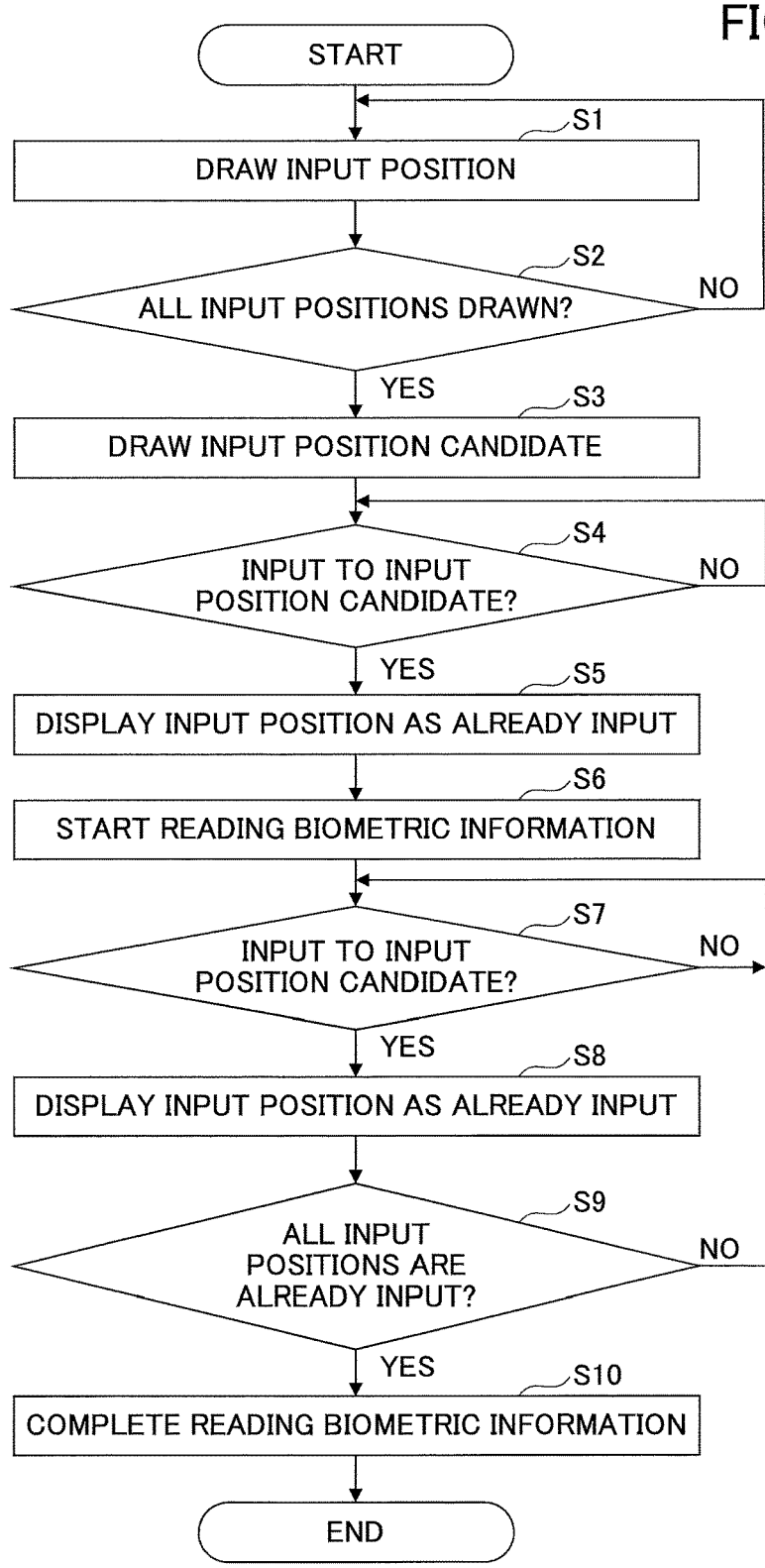
FIG. 9 is a flow chart for explaining an example of a biometric imaging process in one embodiment.

Next, a description will be given of an example of the biometric imaging process, by referring to FIG. 9. FIG. 9 is a flow chart for explaining the example of the biometric imaging process in one embodiment. The biometric imaging process illustrated in FIG. 9 may be performed by the control unit. For example, the CPU 11 illustrated in FIG. 1 may execute the biometric imaging program to perform the biometric imaging process.

In step S1 illustrated in FIG. 9, the control unit draws the input position on the touchscreen panel 22, touched by the fingertip of the user 100, and detected by the detection unit. In step S2, the control unit judges whether all input positions on the touchscreen panel 22 detected by the detection unit are drawn. The process of the control unit returns to step S1 when a judgment result in step S2 is NO. On the other hand, when the judgment result in step S2 is YES, the control unit, in step S3, draws and displays on the touchscreen panel 22 an input position candidate position that is an example of the operation position, according to the input position on the touchscreen panel 22 detected by the detection unit.

In other words, in step S3, the control unit outputs the instruction of the operation position on the operation unit, according to the first input detected by the detection unit. The control unit may set the operation position according to the position of the detected first input, or the control unit may set the operation position to a position stored in the storage unit, for example.

In step S4, the control unit judges whether there is an input to the input position candidate that is an example of the operation position on the touchscreen panel 22, that is, whether there is an input position candidate touched by the fingertip of the user 100. The control unit repeats the judging until a judgment result in step S4 becomes YES. When the judgment result in step S4 becomes YES, the control unit, in step S5, draws and displays the input position candidate as already input on the touchscreen panel 22, that is, in a manner identifiable that the input position candidate is already touched by the fingertip of the user 100. For example, in a case in which the touch locations 222, 223, and 224 illustrated in FIGS. 6A through 6C are displayed, the input position candidate that is already touched is displayed as indicated by the dark hatchings.

In step S5, the control unit may display the first touch location that is already touched on the touchscreen panel 22, and thereafter change the display from the first touch location to the second location. For example, in a case in which the touch locations 222, 223, and 224 illustrated in FIGS. 6A through 6C are displayed, after displaying the input position candidate that is already touched as indicated by the dark hatchings, the next input position candidate is displayed as indicated by the thin-shaded hatchings. The first touch location may be set to a position where a capturing target of the biometric capturing unit becomes a portion of the palm 100A of the user 100 adjacent to a wrist of the user 100, and the second touch location may be set to a position where the capturing target of the biometric capturing unit becomes a portion of the palm 100A of the user 100 adjacent to fingers of the user 100. In this case, the moving direction of the fingertip of the user 100 may be the downward direction in FIGS. 3A and 3B. In addition, the first touch location may be set to the position where the capturing target of the biometric capturing unit becomes the portion of the palm 100A of the user 100 adjacent to the fingers of the user 100, and the second touch location may be set to the position where the capturing target of the biometric capturing unit becomes the portion of the palm 100A of the user 100 adjacent to the wrist of the user 100. In this latter case, the moving direction of the fingertip of the user 100 may be the upward direction in FIGS. 3A and 3B.

Further, in step S5, the control unit may display the move instruction to move the touch location, such as the moving route, on the touchscreen panel 22. The move instruction may be a sliding instruction made by two or more fingertips of the user 100, for example. Moreover, the move instruction may be at least one of the linear, the Z-shaped, the approximate rectangular, the approximate circular or oval-shaped, and the approximate triangular shaped instruction.

In step S6, the control unit controls the sensor part 16 to start reading, that is, start capturing the palm 100A of the user 100, that is an example of the biometric part. The capturing may be started by starting to store the biometric image information of the user 100 input from the sensor part 16, into the storage unit. In addition, in a case in which a delay $\Delta T_d$ occurs before the storage of the biometric image information into the storage unit actually starts, a ring buffer may be formed and the storage of the biometric image information into the storage unit may be started at or before step S1, or at or before step S3, together with the storage of a time stamp $T_s$. In this case, based on the time stamp $T_s$ in step S6, the biometric image information captured at or after a maximum time stamp $T_{s'max}$ satisfying $T_s' <= T_s - \Delta T_d$ may be stored in the storage unit.

In step S7, the control unit judges whether there is an input to the input position candidate on the touchscreen panel 22, that is, whether there is an input position candidate touched by the fingertip of the user 100. The control unit repeats the judging until a judgment result in step S7 becomes YES.

When the judgment result in step S7 becomes YES, the control unit, in step S8, draws and displays the input position candidate as already input on the touchscreen panel 22, that is, in the manner identifiable that the input position candidate is already touched by the fingertip of the user 100, similarly to step S5 described above.

In step S8, the control unit may display the first touch location that is already touched on the touchscreen panel 22, and thereafter change the display from the first touch location to the second location. Further, in step S5, the control unit may display the move instruction to move the touch location, such as the moving route, on the touchscreen panel 22.

In step S9, the control unit judges whether all of the input position candidates on the touchscreen panel 22, that are examples of the touch locations, are already input with an input. The process returns to step S7 when a judgment result in step S9 is NO. On the other hand, when the judgment result in step S9 is YES, the process advances to step S10. In step S10, the control unit controls the sensor part 16 to complete (or end) capturing of the palm 100A of the user 100, that is an example of the biometric part, and the process ends.

The control unit may judge the completion of capturing the biometric part, based on a reliability of the biometric information with respect to the capture area. For example, the reliability of the biometric information may be computed by utilizing an area of the capture area, based on the position of the input position that already input on the touchscreen panel 22. More particularly, a ratio of the capture area that is captured with respect to the maximum capture area may be regarded as the reliability of the biometric information.

First Example of Touch Location

FIGS. 10A and 10B are diagrams for explaining a first example of the touch location. FIG. 10A illustrates a plan view of the terminal apparatus 1 operated by the user 100, and FIG. 10B illustrates a side view of the terminal apparatus 1 operated by the user 100. In FIGS. 10A and 10B, those parts that are the same as those corresponding parts in FIGS. 3A and 3B are designated by the same reference numerals, and a description thereof will be omitted. In the example illustrated in FIGS. 10A and 10B, a plurality of (three in this example) touch locations 225 extending in a vertical direction are displayed. The user 100 simultaneously traces the three touch locations 225 by the user's fingers (index finger, middle finger, and ring finger in this example), and the sensor part 16 captures the palm 100A of the user 100 within the capture area 16A while the simultaneous tracing takes place. In a case in which the user 100 simultaneously makes the sliding instruction with respect to the touch locations 225 by the user's fingertips, an angle of the palm 100A with respect to the touchscreen panel 22 is stable and does not greatly change while the simultaneous sliding of the user's fingertips occurs on the touchscreen panel 22. For this reason, it is possible to reduce an error in a relative angle between the terminal apparatus 1 and the hand of the user 100, and the sensor part 16 can stably capture the palm 100A of the user 100.

FIG. 10A illustrates a case in which the three touch locations 225 including all ranges of the operation positions are continuously displayed in the form of bars on the touch screen panel 22. However, the three touch locations 225 may display the ranges of the operation positions in an intermittent manner, in the form of intermittent bar portions.

Second Example of Touch Location

FIGS. 11A and 11B are diagrams for explaining a second example of the touch location. FIGS. 11A and 11B illustrate plan views of the terminal apparatus 1 operated by the user 100. In FIGS. 11A and 11B, those parts that are the same as those corresponding parts in FIGS. 10A and 10B are designated by the same reference numerals, and a description thereof will be omitted. In the example illustrated in FIGS. 11A and 11B, the control unit displays an operation position 325 instructing the first input for each of the three touch locations 225. In this example, as illustrated in FIG. 11A, an outline (or white) arrow is displayed within the operation position 325 indicated in black, to indicate the moving direction. When the user 100 makes the first input by touching the operation position 325 instructing the first input, a touched location 225A that is already input is displayed in an identifiable manner, as indicated by dark hatchings in FIG. 11B. In addition, when the first input is made, the touch location 225 at least including the operation position instructing the second input is displayed in an identifiable manner, as indicated by thin-shaded hatchings in FIG. 11B. The display is made similarly thereafter. In other words, when the user 100 makes the second input by touching the operation position 325 instructing the second input, a touched location 225A that is already input is displayed in an identifiable manner, as indicated by dark hatchings. In addition, when the second input is made, the touch location 225 at least including the operation position instructing the next, third input is displayed in an identifiable manner, as indicated by thin-shaded hatchings. For the sake of convenience, FIGS. 11A and 11B illustrate a case in which the three touch locations 225 including all ranges of the operation positions are continuously displayed in the form of bars on the touch screen panel 22, similarly to FIG. 10A described above.

In the example illustrated in FIGS. 11A and 11B, the user 100 can simultaneously make the sliding instruction with respect to the three touch locations 225, in a state in which the user's fingertips are placed on the corresponding operation positions 325, using the operation positions 325 of the touch locations 225 as guides. While the fingertips of the user 100 simultaneously slide on the touchscreen panel 22 using the operation positions 325 as the guides, the angle of the palm 100A with respect to the touchscreen panel 22 is stable and does not greatly change while the simultaneous sliding of the user's fingertips occurs on the touchscreen panel 22. For this reason, it is possible to reduce the error in the relative angle between the terminal apparatus 1 and the hand of the user 100, and the sensor part 16 can stably capture the palm 100A of the user 100.

In FIGS. 11A and 11B, the following relationships (1) stand between a distance L and a time $\Delta T$ from a point in time when the input (that is, touch) to the operation position instructing the first input is made to a point in time when the operation position instructing the next, second input is displayed and the second input becomes possible, where V denotes a capture distance of the sensor part 16 and f denotes a frame rate.

$$\begin{cases} L/\Delta T < V \times f \\ L < V \times \Delta T \times f \end{cases} \quad (1)$$

The distance L indicates the distance in the vertical direction (direction of the outline (white) arrow in FIGS. 11A and 11B) in which the user 100 slides the user's fingertips on the touchscreen panel 22. The capture distance V indicates the distance in the vertical direction of the capture area 16A of the sensor part 16.

For example, in a case in which the capture distance V of the sensor part 16 is 30 mm and the capture interval is 20 fps (frames per second), it is ideally possible to continuously capture the movements of the hand having a maximum speed of 600 mm/second without discontinuity. In a case in which an update rate of the screen display on the touchscreen panel (or display device 15) is 50 Hz, and the screen display on the touchscreen panel 22 (or display device 15) is updated in accordance with this update rate, it follows from $\Delta T = \frac{1}{50} = 0.02$ second, that L<12 mm.

When an overlapping area of the capture areas 16A in the vertical direction for a case in which the sensor part 16 continuously captures the user 100 is denoted by S, the following relationships (2) stand.

$$\begin{cases} L/\Delta T < (V-S) \times f \\ L < (V-S) \times \Delta T \times f \end{cases} \quad (2)$$

The overlapping area S is a margin for positively ensuring that the capture areas 16A are continuous without discontinuity. For this reason, by setting the distance L and the time $\Delta T$ described above by taking into consideration the overlapping area S, it is possible to obtain an accurate capture area 16A that takes into consideration a positional error of the sensor part 16, and enable a biometric authentication process having a stable authentication accuracy.

The following relationships (3) stand, in a case in which the update capacity of the screen display on the touchscreen panel 22 (or display device 15) is high, or in a case in which the updating of the screen display is decimated for the purposes of reducing a load on a process to update the screen display by updating once in every N updates (where N is a natural number greater than or equal to 2).

$$\begin{cases} L/(N \times \Delta T) < (V-S) \times f \\ L < (V-S) \times (N \times \Delta T) \times f \end{cases} \quad (3)$$

Accordingly, the control unit can take into consideration the performance of the sensor part 16 and the touchscreen panel 22 (or display device 15) and determine the touch location including the operation position based on one of the relationships (1), (2), and (3) described above, so that the sensor part 16 can continuously capture the palm 100A of the user 100 without discontinuity.

In a case in which the touch location including the operation positions is linearly arranged, the control unit may use, as the reliability of the biometric information, a distance from the operation position (or touch position) that is already input first, in place of using the occupying ratio of the capture distance V.

Third Example of Touch Location

Figure 12A:
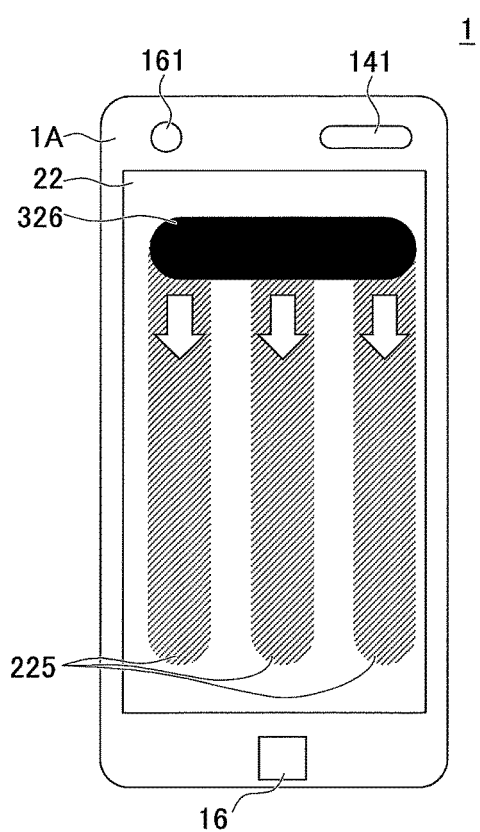
FIGS. 12A and 12B are diagrams for explaining a third example of the touch location.
Figure 12B:
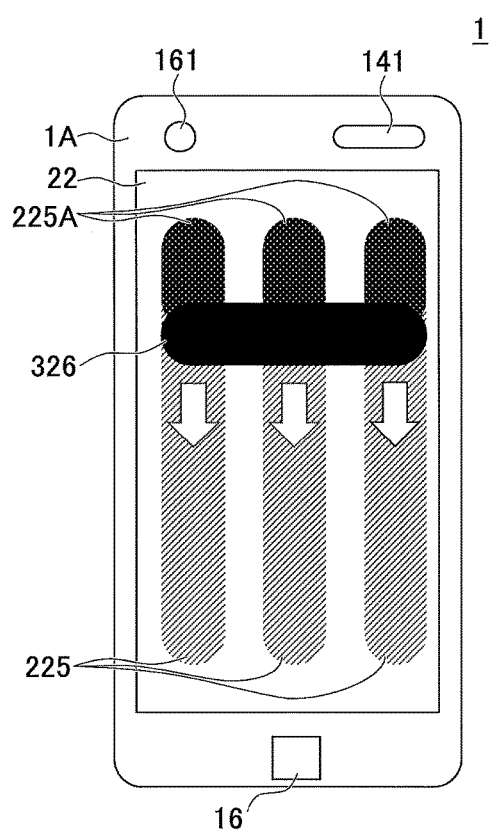

FIGS. 12A and 12B are diagrams for explaining a third example of the touch location. FIGS. 12A and 12B illustrate plan views of the terminal apparatus 1 operated by the user 100. In FIGS. 12A and 12B, those parts that are the same as those corresponding parts in FIGS. 11A and 11B are designated by the same reference numerals, and a description thereof will be omitted. In the example illustrated in FIGS. 12A and 12B, the control unit displays a single operation position 326 as a common guide with respect to the three touch locations 225, instead of displaying a separate operation position 325 for each of the three touch locations 225 as illustrated in FIGS. 11A and 11B. The single operation position 326 has a bar shape. In this case, the sensor part 16 can also stably capture the palm 100A of the user 100.

Fourth Example of Touch Location

Figure 13:
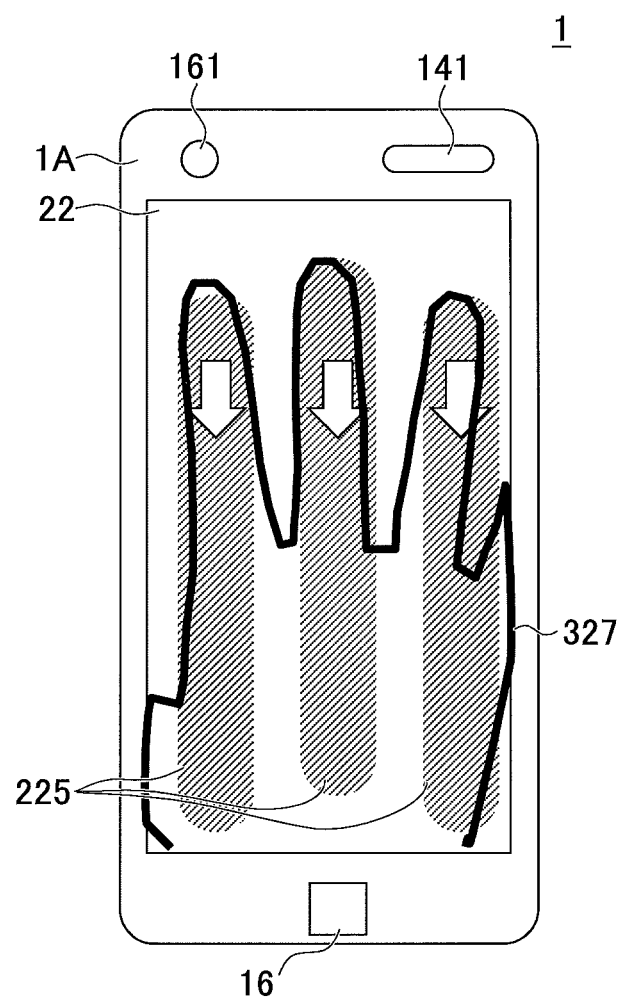
FIG. 13 is a diagram for explaining a fourth example of the touch location.

FIG. 13 is a diagram for explaining a fourth example of the touch location. FIG. 13 illustrates a plan view of the terminal apparatus 1 operated by the user 100. In FIG. 13, those parts that are the same as those corresponding parts in FIGS. 10A and 10B are designated by the same reference numerals, and a description thereof will be omitted. The user 100 may erroneously operate the touch location by a finger other than the originally intended finger. Hence, in the example illustrated in FIG. 13, the control unit displays a hand shape 327 on the touchscreen panel 22, in addition to the three touch locations 225, so as to instruct the user 100 of the user's fingers that are to touch the touchscreen panel 22. The user 100 can place the user's hand in accordance with the hand shape 327 displayed on the touchscreen panel 22, and slide the user's index finger, middle finger, and ring finger along the touch locations 225. Thus, it is possible to prevent an erroneous operation in which the user 100 erroneously uses incorrect fingers, different from the originally intended fingers, to operate the touchscreen panel 22. In this case, the sensor part 16 can also stably capture the palm 100A of the user 100. The control unit may move the hand shape 327 displayed on the touchscreen panel 22 according to the sliding operation made by the fingertips of the user 100.

Fifth Example of Touch Location

Figure 14A:
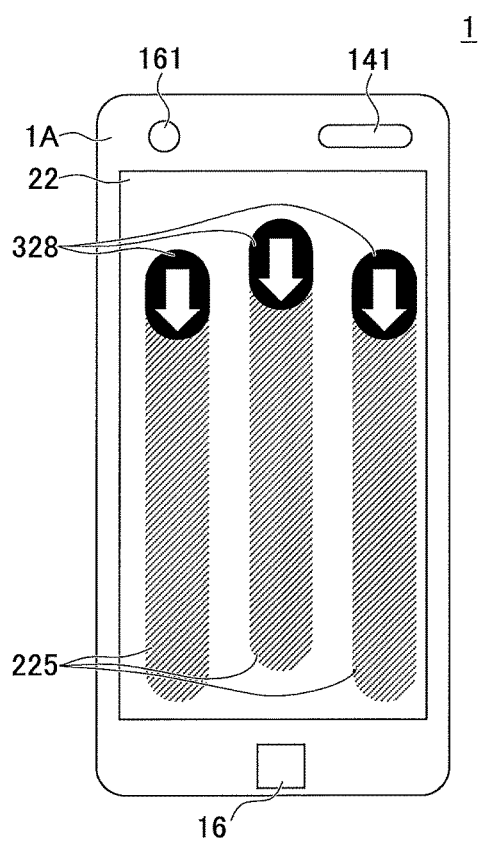
FIGS. 14A and 14B are diagrams for explaining a fifth example of the touch location.
Figure 14B:
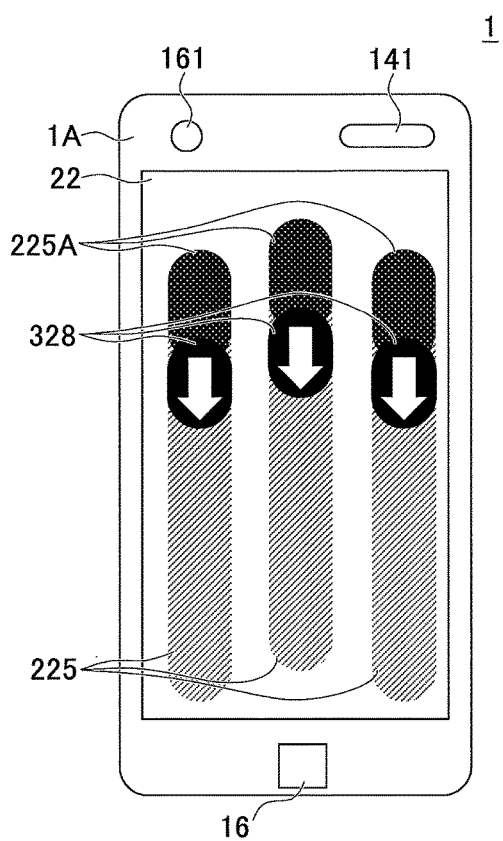

FIGS. 14A and 14B are diagrams for explaining a fifth example of the touch location. FIGS. 14A and 14B illustrate plan views of the terminal apparatus 1 operated by the user 100. In FIGS. 14A and 14B, those parts that are the same as those corresponding parts in FIGS. 11A and 11B are designated by the same reference numerals, and a description thereof will be omitted. Generally, the human middle finger is longer than other fingers. Hence, in this example illustrated in FIGS. 14A and 14B, the control unit displays on the touchscreen panel 22 an operation position instructing the first input with respect to each of the three touch locations 225, at positions deviated along the vertical direction in accordance with the lengths of the fingers. In this example, an operation position 328 of the center touch location 225 is arranged at a position higher than the operation positions 328 of the touch locations 225 on both sides of the center touch location 225. In this case, the user 100 can intuitively understand that the center operation position 328 corresponds to the middle finger, and it is possible to prevent an erroneous operation in which the user 100 erroneously uses incorrect fingers, different from the originally intended fingers, to operate the touchscreen panel 22. In addition, by arranging the operation positions 328 of each of the touch locations 225 at positions corresponding to the lengths of the fingers, it is possible to guide the user 1000 to make the input with the user's fingers bent in a natural position. Moreover, a triangular shape (or three-point support) is formed on the touchscreen panel 22 by the user's fingertips of the index, middle, and ring fingers that are naturally bent according to the lengths of these fingers. This triangular shape can stabilize the hand movement and angle (or orientation) of the user 100 after the first input ends and the display is updated to the operation position instructing the next, second input, until the second input ends. The user 100 can thus operate the touchscreen panel 22 while maintaining a natural hand shape and a stable hand shape, and a difference is unlikely to occur between the moving distance of the fingertips and the moving distance of the entire hand, compared to a case in which the user's fingers are unnaturally bent during the operation. Accordingly, the enlarged capture area 16B of the sensor 16 stabilizes, and the reproducibility improves, to enable the biometric authentication process to be performed with a stable authentication accuracy.

Sixth Example of Touch Location

Figure 15A:
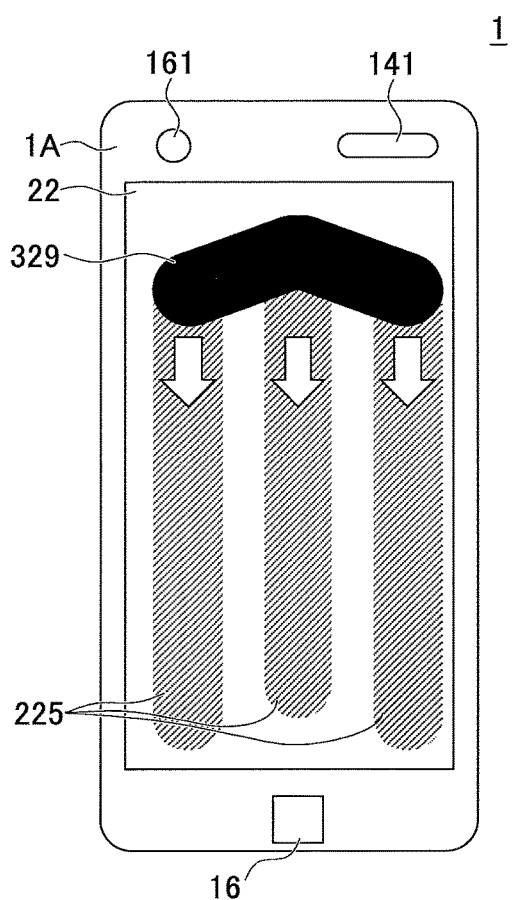
FIGS. 15A and 15B are diagrams for explaining a sixth example of the touch location.
Figure 15B:
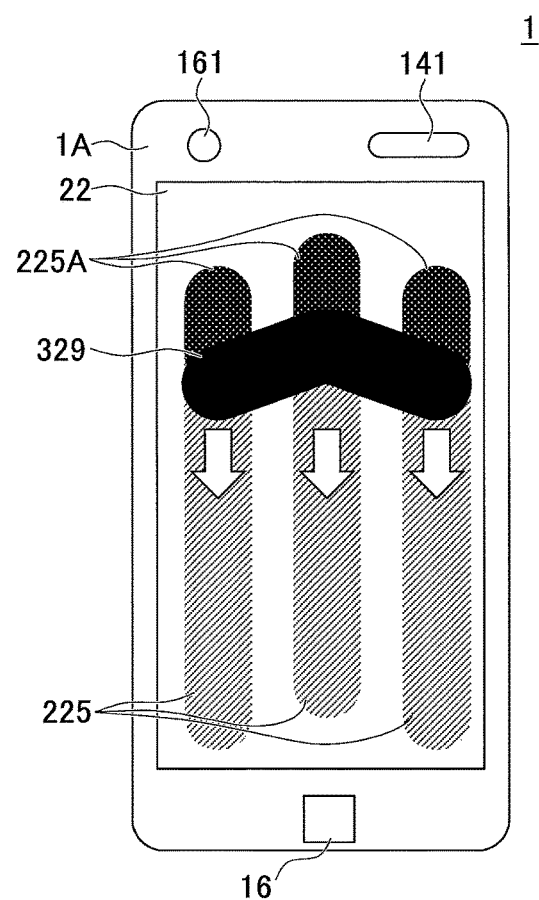

FIGS. 15A and 15B are diagrams for explaining a sixth example of the touch location. FIGS. 15A and 15B illustrate plan views of the terminal apparatus 1 operated by the user 100. In FIGS. 15A and 15B, those parts that are the same as those corresponding parts in FIGS. 14A and 14B are designated by the same reference numerals, and a description thereof will be omitted. In the example illustrated in FIGS. 15A and 15B, the control unit displays a single operation position 329 as a common guide with respect to the three touch locations 225, instead of displaying a separate operation position 328 for each of the three touch locations 225 as illustrated in FIGS. 14A and 14B. The single operation position 329 has a dog-leg shape according to the lengths of the three corresponding fingers. In this case, it is also possible to obtain effects similar to those obtainable by the fifth embodiment described above.

In the second example of the touch location illustrated in FIGS. 11A and 11B and the fifth example of the touch location illustrated in FIGS. 14A and 14B, portions of the touch locations 225 may be hidden by the hand operating touch locations 225A that are already input, and it may be difficult to make the input in accordance with the touch locations 225. On the other hand, in the third example of the touch location illustrated in FIGS. 12A and 12B and the sixth example of the touch location illustrated in FIGS. 15A and 15B, the control unit instructs the touch locations 225 in synchronism with the input operation made by the user 100. In addition, in the third and sixth examples, by displaying the operation positions 326 and 329 in the bar shape and the dog-leg shape, respectively, which are visible by the user 100 between the user's fingers, it is possible to facilitate the input in accordance with the touch locations 225. The shape and display format of the operation positions 326 and 329 that connect the three touch locations 225 into the single bar or dog-leg shape are not limited to those of the third and sixth examples of the touch locations, as long as the operation positions 326 and 329 are visible between the user's fingers while the input operation is being made by the user 100.

In the first through sixth examples of the touch locations described above in conjunction with FIGS. 10A through 15B, the user 100 makes the input operation using a plurality of fingers with respect to the plurality of touch locations. However, in the input operation sequence, the inputs made by the plurality of fingers are unlikely to become inconsistent. For this reason, after capturing by the sensor part 16 starts, the input operation does not necessarily have to be always made simultaneously with respect to all of the touch locations. The angle (or orientation) of the hand of the user 100 stabilizes most when the input operation is simultaneously made with respect to the plurality of touch locations. However, even in a case in which the angle (or orientation) of the user's hand is stable, one finger may float from the touchscreen panel 22 for an instant. In this case, the touch location that guides the next touch is not instructed, and the user's hand may go ahead of the touch location that guides the next touch due to inertia of the hand, to generate the possibility of not being able to make an appropriate input operation.

Accordingly, in the case in which the three touch locations are displayed as in the first through sixth examples of the touch locations, as long as the input operation is made with respect to the one, center touch location, for example, the touch location for guiding the next touch may be updated with respect to all of the three touch locations. In this case, it is possible to reduce the amount of computation that is required, compared to a case in which the touch locations for guiding the next touch are updated according to the input operation with respect to each of the three touch locations. Alternatively, the touch location for guiding the next touch may be updated with respect to all of the three touch locations, under a condition that the input operation is simultaneously made with resect to two of the three touch locations, such as the right and left touch locations on both sides of the center touch location.

However, when the start of capturing by the sensor part 16 is judged based solely on the input operation with respect to one touch location, there is a possibility of tolerating an unstable state of the hand angle (or orientation). For this reason, it is desirable that the start of the capturing by the sensor part 16 is judged under a condition that the input operation is simultaneously made with respect to a plurality of touch locations. In the case of the first through sixth examples of the touch locations, the input operation is simultaneously made by the index and ring fingers of the user 100 with respect to the two touch locations on both the right and left sides of the center touch location, and the position of the middle finger of the user 100 that makes the input operation with respect to the one, center touch location is naturally restricted, to thereby stabilize the hand angle (or orientation). Accordingly, the start of the capturing by the sensor part 16 may be judged under the condition that the input operation is simultaneously made with respect to the two touch locations on both sides of the center touch location.

Seventh Example of Touch Location

Figure 16:
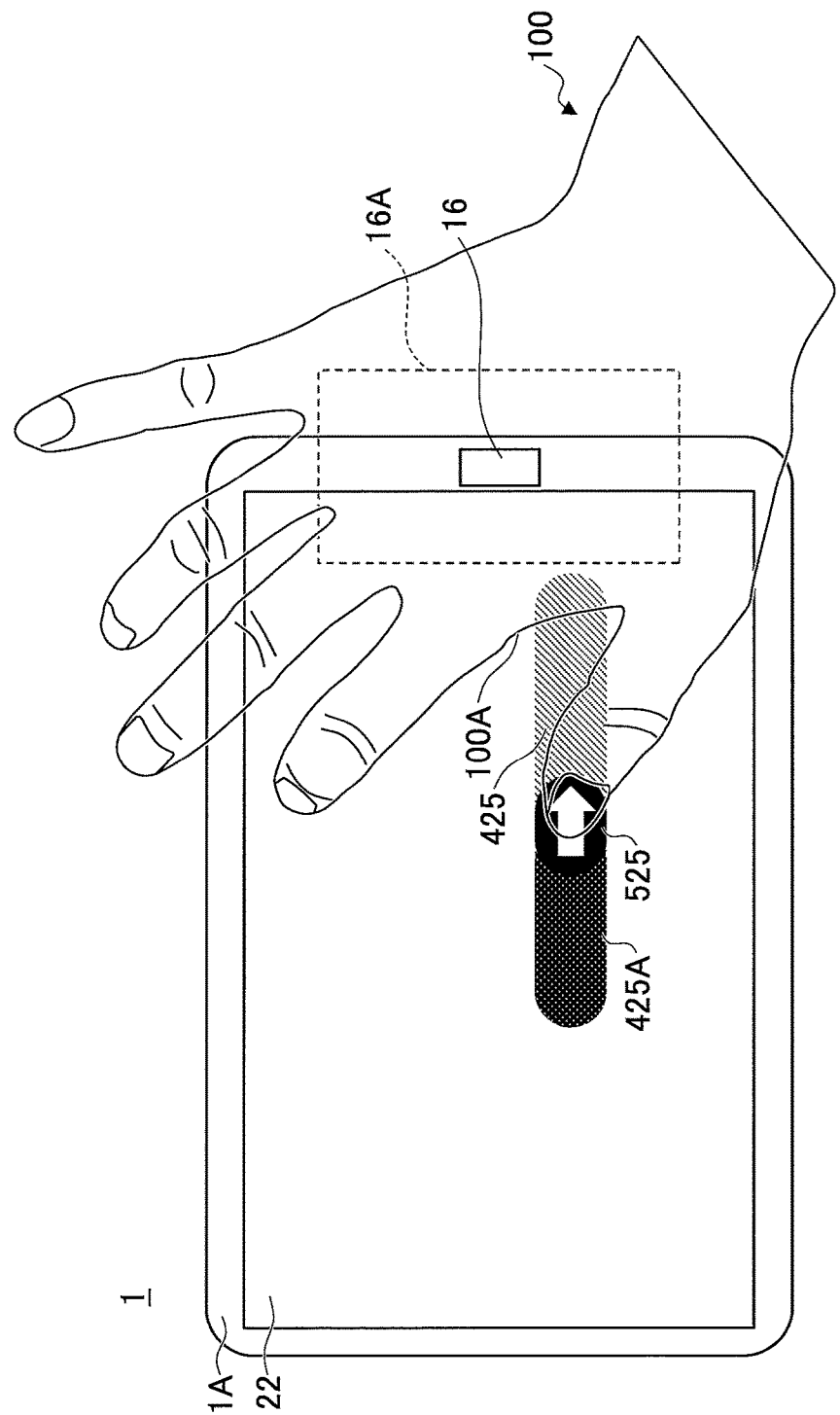
FIG. 16 is a diagram for explaining a seventh example of the touch location.

FIG. 16 is a diagram for explaining a seventh example of the touch location. FIG. 16 illustrates a plan view of the terminal apparatus 1 operated by the user 100. In FIG. 16, those parts that are the same as those corresponding parts in FIGS. 10A and 10B are designated by the same reference numerals, and a description thereof will be omitted. In addition, the illustration of the other sensor part 161 or the like is omitted in FIG. 16. In this example, the user 100 operates the terminal apparatus 1 that is in a horizontally long posture by touching the input position on the touchscreen panel 22 by the user's fingertip. The sensor part 16 is arranged at a position on the same top surface of the casing 1A provided with the touchscreen panel 22, so that the sensor part 16 captures the palm 100A of the user 100 when the user 100 touches the input position on the touchscreen panel 22 by the user's fingertip. In other words, the positional relationship of the touchscreen panel 22 and the sensor part 16 is not limited to the upper and lower positions of the terminal apparatus 1 in the operated posture, and may include the left and right positions of the terminal apparatus 1 in the operated posture.

In the example illustrated in FIG. 16, the control unit displays on the touchscreen panel 22 an operation position 525 instructing the first input for a touch location 425. In this example, as illustrated in FIG. 16, an outline (or white) arrow indicating the moving direction is displayed within the operation position 525 indicated in black. When the user 100 touches the operation position 525 instructing the first input and the first input ends, a touched location 425A that is already input is displayed in an identifiable manner as indicated by dark hatchings in FIG. 16. In addition, when the first input ends, the touch location 425 at least including the operation position instructing the second input is displayed in an identifiable manner, as indicated by thin-shaded hatchings in FIG. 16. Similarly thereafter, when the user 100 touches the operation position 525 instructing the second input and the second input ends, the touched location 425A that is already input is displayed in an identifiable manner as indicated by dark hatchings. In addition, when the second input ends, the touch location 425 at least including the operation position instructing the next, third input is displayed in an identifiable manner, as indicated by thin-shaded hatchings. In this example, the user 100 makes the sliding instruction with respect to the touch location 425 by sliding the user's thumb on the touchscreen panel 22.

In a case in which one touch location is displayed on the touchscreen panel 22 as in the example illustrated in FIG. 16, the user's hand may easily turn around a normal direction with respect to the surface of the touchscreen panel 22, when the user 100 operates the touchscreen panel 22 by the user's hand. When the user 100 operates the terminal apparatus 1 that is in the horizontally long posture, a similar behavior (or turn) of the user's hand may be observed when only one touch location is displayed on the touchscreen panel 22.

On the other hand, when a plurality of touch locations are displayed on the touchscreen panel 22, it is possible to reduce the turn of the user's hand around the normal direction with respect to the surface of the touchscreen panel 22, and stabilize the angle (or orientation) of the user's hand. As a result, the enlarged capture area 16B of the sensor part 16 stabilizes, and the reproducibility improves, to enable a biometric authentication process having a stable authentication accuracy.

Eighth Example of Touch Location

Figure 17:
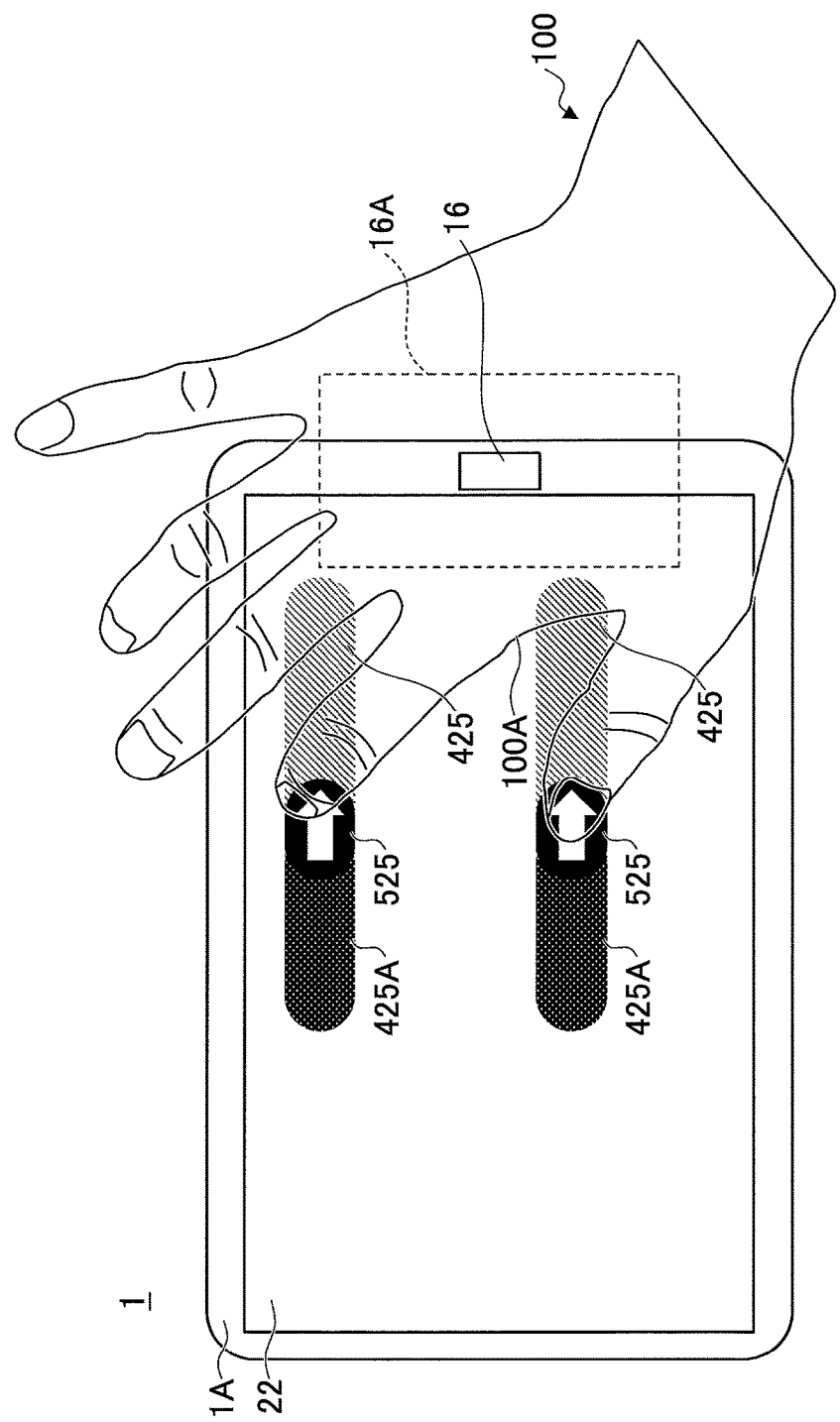
FIG. 17 is a diagram for explaining an eighth example of the touch location.

FIG. 17 is a diagram for explaining an eighth example of the touch location. FIG. 17 illustrates a plan view of the terminal apparatus 1 operated by the user 100. In FIG. 17, those parts that are the same as those corresponding parts in FIG. 16 are designated by the same reference numerals, and a description thereof will be omitted. In the example illustrated in FIG. 17, two or more linear touch locations 425 are displayed on the touchscreen panel 22. In this example, two touchscreen locations 425 extending in the horizontal direction are displayed on the touchscreen panel 22. The user 100 simultaneously traces the two touch locations 425 by the user's fingers (thumb and index finger in this example), and the sensor part 16 captures the palm 100A within the capture area 16A while the simultaneous tracing takes place. In the case in which the user 100 simultaneously makes the sliding instruction with respect to the touch locations 425 by the plurality of fingers, the angle of the palm 100A with respect to the touchscreen panel 22 is stable and does not greatly change while the plurality of fingers simultaneously slide on the touchscreen panel 22. For this reason, it is possible to reduce an error in the relative angle between the terminal apparatus 1 and the hand of the user 100, and the sensor part 16 can stably capture the palm 100A of the user 100.

In this example, the control unit displays, on the touchscreen panel 22, the operation position 525 instructing the first input for each of the touch locations 425. In this example, as illustrated in FIG. 17, an outline (or white) arrow indicating the moving direction is displayed within the operation position 525 indicated in black. When the user 100 touches the operation position 525 instructing the first input and the first input ends, a touched location 425A that is already input is displayed in an identifiable manner as indicated by dark hatchings in FIG. 17. In addition, when the first input ends, the touch location 425 at least including the operation position instructing the second input is displayed in an identifiable manner, as indicated by thin-shaded hatchings in FIG. 17. Similarly thereafter, when the user 100 touches the operation position 525 instructing the second input and the second input ends, the touched location 425A that is already input is displayed in an identifiable manner as indicated by dark hatchings. In addition, when the second input ends, the touch location 425 at least including the operation position instructing the next, third input is displayed in an identifiable manner, as indicated by thin-shaded hatchings. For the sake of convenience, FIG. 17 illustrates a case in which the two touch locations 425 including all ranges of the operation positions are continuously displayed in the form of bars on the touch screen panel 22, similarly to FIG. 10A described above.

In this example, the user 100 can simultaneously make the sliding instruction with respect to the two touch locations 425, in a state in which the user's fingertips are placed on the corresponding operation positions 525, using the operation positions 525 of the touch locations 425 as guides. While the fingertips of the user 100 simultaneously slide on the touchscreen panel 22 using the operation positions 525 as the guides, the angle of the palm 100A with respect to the touchscreen panel 22 is stable and does not greatly change while the simultaneous sliding of the user's fingertips occurs on the touchscreen panel 22. For this reason, it is possible to reduce the error in the relative angle between the terminal apparatus 1 and the hand of the user 100, and the sensor part 16 can stably capture the palm 100A of the user 100.

The first touch location may be set to a position where a capturing target of the biometric capturing unit becomes a portion of the palm 100A of the user 100 adjacent to the wrist of the user 100, and the second touch location may be set to a position where the capturing target of the biometric capturing unit becomes a portion of the palm 100A of the user 100 adjacent to the fingers of the user 100. In addition, the first touch location may be set to the position where the capturing target of the biometric capturing unit becomes the portion of the palm 100A of the user 100 adjacent to the fingers of the user 100, and the second touch location may be set to the position where the capturing target of the biometric capturing unit becomes the portion of the palm 100A of the user 100 adjacent to the wrist of the user 100.

Ninth Example of Touch Location

Figure 18:
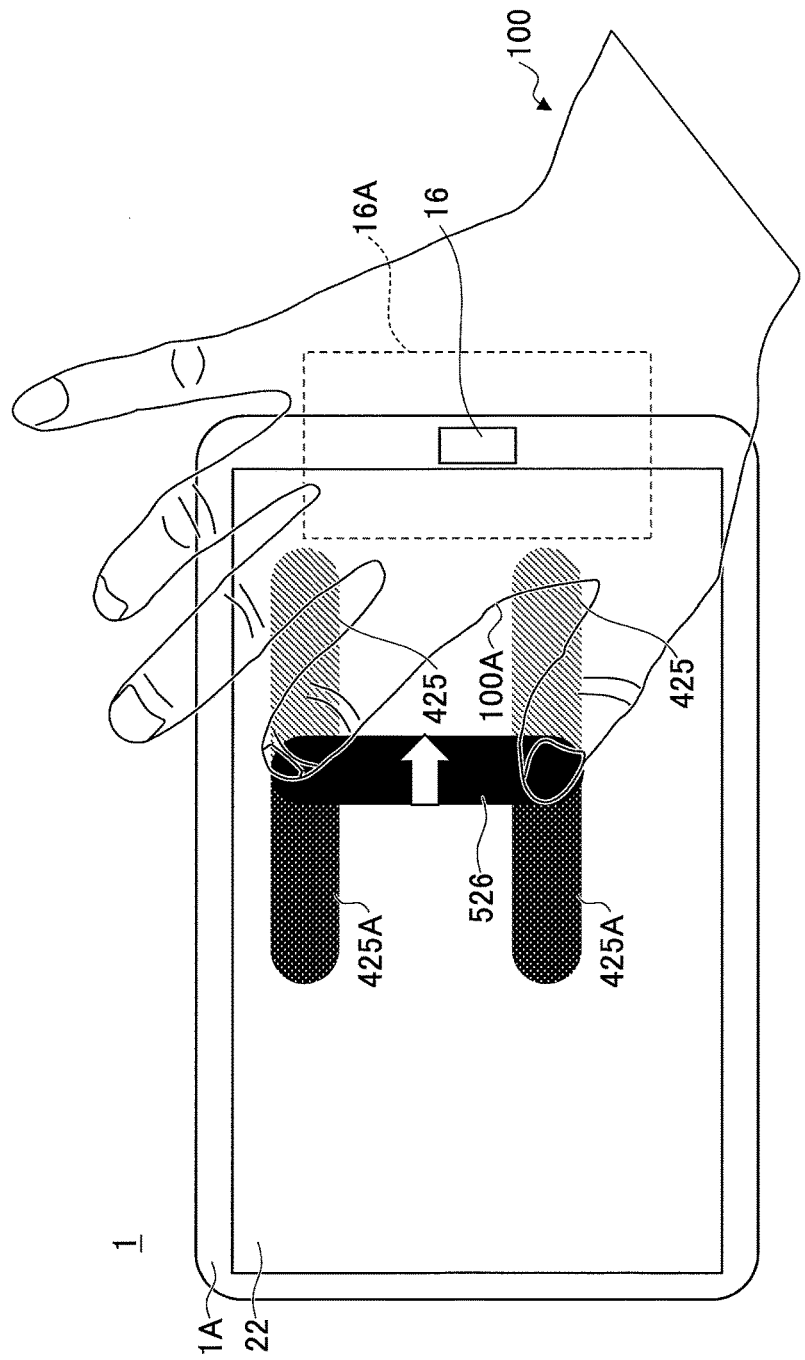
FIG. 18 is a diagram for explaining a ninth example of the touch location.

FIG. 18 is a diagram for explaining a ninth example of the touch location. FIG. 18 illustrates a plan view of the terminal apparatus 1 operated by the user 100. In FIG. 18, those parts that are the same as those corresponding parts in FIG. 17 are designated by the same reference numerals, and a description thereof will be omitted. In the example illustrated in FIG. 18, the control unit displays a single operation position 526 as a common guide with respect to the three touch locations 425, instead of displaying a separate operation position 525 for each of the two touch locations 425 as illustrated in FIG. 17. The single operation position 526 has a bar shape. In this case, the sensor part 16 can also stably capture the palm 100A of the user 100.

In the eighth example of the touch location described above in conjunction with FIG. 17, portions of the touch locations 425 may be hidden by the hand operating touch locations 425A that are already input, and it may be difficult to make the input in accordance with the touch locations 425. On the other hand, in the ninth example of the touch location illustrated in FIG. 18, the control unit instructs the touch locations 425 in synchronism with the input operation made by the user 100. In addition, in the ninth example, by displaying the operation position 526 in the bar shape which is visible by the user 100 between the user's fingers, it is possible to facilitate the input in accordance with the touch locations 425. The shape and display format of the operation position 526 that connects the two touch locations 425 into the single bar is not limited to those of the ninth example of the touch location, as long as the operation position 526 is visible between the user's fingers while the input operation is being made by the user 100.

In the eighth and ninth examples of the touch locations described above in conjunction with FIGS. 17 and 18, the user 100 makes the input operation using a plurality of fingers with respect to the plurality of touch locations. However, in the input operation sequence, the inputs made by the plurality of fingers are unlikely to become inconsistent. For this reason, after the capturing by the sensor part 16 starts, the input operation does not necessarily have to be always made simultaneously with respect to all of the touch locations. The angle (or orientation) of the hand of the user 100 stabilizes most when the input operation is simultaneously made with respect to the plurality of touch locations. However, even in a case in which the angle (or orientation) of the user's hand is stable, one finger may float from the touchscreen panel 22 for an instant. In this case, the touch location that guides the next touch is not instructed, and the user's hand may go ahead of the touch location that guides the next touch due to inertia of the hand, to generate the possibility of not being able to make an appropriate input operation.

Accordingly, in the case in which the two touch locations are displayed as in the eighth and ninth examples of the touch locations, as long as the input operation is made with respect to one of the two touch locations, for example, the touch location for guiding the next touch may be updated with respect to both of the two touch locations. In this case, it is possible to reduce the amount of computation that is required, compared to a case in which the touch locations for guiding the next touch are updated according to the input operation with respect to each of the two touch locations.

However, when the start of the capturing by the sensor part 16 is judged based solely on the input operation with respect to one touch location, there is a possibility of tolerating an unstable state of the hand angle (or orientation). For this reason, it is desirable that the start of the capturing by the sensor part 16 is judged under a condition that the input operation is simultaneously made with respect to a plurality of touch locations.

The sequence of the biometric imaging process when displaying the first through ninth examples of the touch locations on the touchscreen panel 22 may be the same as the sequence of the biometric imaging process described above in conjunction with FIG. 9. In this case, it is possible to guide the user 100 to perform the operation by sliding the user's finger or fingers on the touchscreen panel 22.

Tenth Example of Touch Location

Figure 19:
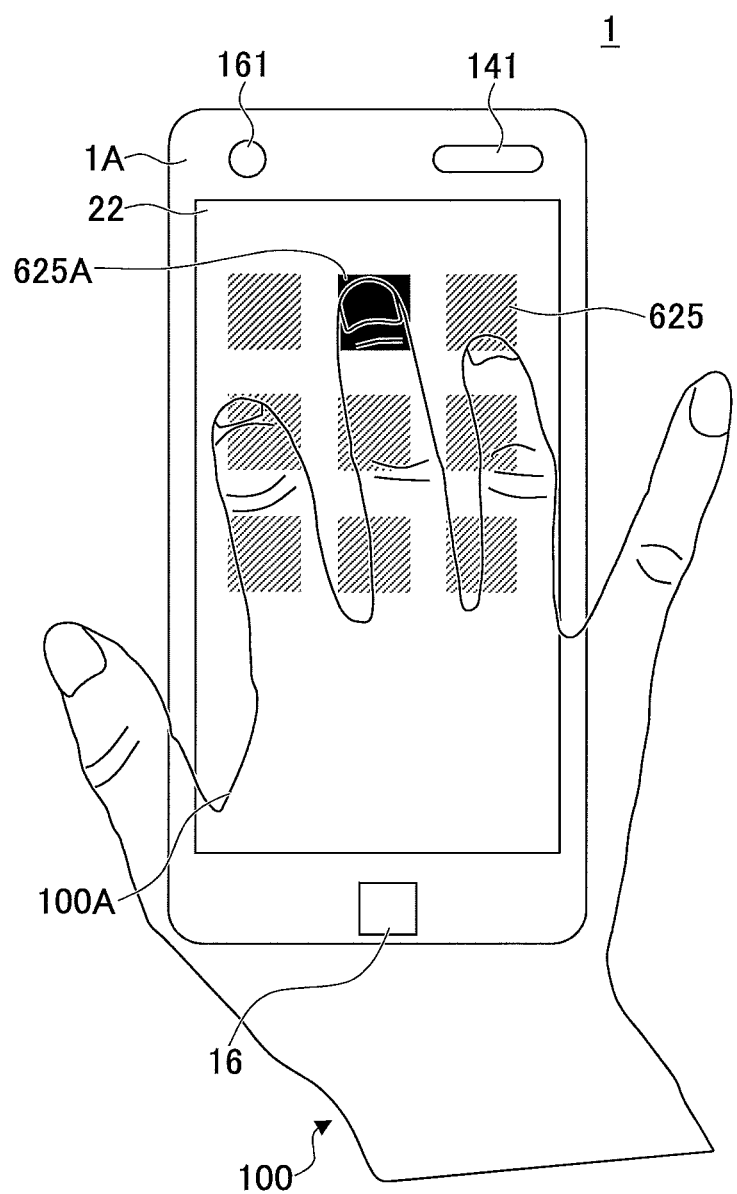
FIG. 19 is a diagram for explaining a tenth example of the touch location.

FIG. 19 is a diagram for explaining a tenth example of the touch location. FIG. 19 illustrates a plan view of the terminal apparatus 1 operated by the user 100. In FIG. 19, those parts that are the same as those corresponding parts in FIGS. 3A and 3B are designated by the same reference numerals, and a description thereof will be omitted. In the example illustrated in FIG. 19, the control unit displays on the touchscreen panel 22 touch locations 625 indicated by thin-shaded hatchings at a location that is separated by a predetermined distance or more from a touched location 625A that is already input (touched) and indicated in black. This example employs an arrangement in which a total of nine touch locations 625 are displayable on the touchscreen panel 22. In the first through ninth examples of the touch locations described above, the user 100 makes the sliding instruction with respect to the touch location, however, in this example, the user 100 touches the different touch locations in a sequence by the user's fingertip.

FIGS. 20A, 20B, and 20C are diagrams for explaining operation states of the terminal apparatus illustrated in FIG. 19. FIG. 20A illustrates an input standby state in which the control unit displays the nine touch locations 625 on the touchscreen panel 22. In this input standby state, the user 100 can arbitrarily touch and select the nine touch locations 625 by the user's fingertip.

FIG. 20B illustrates a state in which the first touch location 625 at the top left on the touchscreen panel 22 in FIG. 20A is touched and selected. In this state, the control unit displays the first touch location 625A at the top left of the touchscreen panel 22 to indicate this already input touch location 625A, as indicated in black in FIG. 20B.

FIG. 20C illustrates a next input standby state in which second touch locations 625B instructing second input to the user 100 are displayed with respect to the already input first touch location 625A. In this state, the control unit displays, with reference to the last already input touch location (in this case, the first touch location 625A), second touch location candidates 625B that are farthest from the reference (first touch location 625A) in vertical, horizontal, and diagonal directions. In this example, five touch locations 625 are displayed as the second touch location candidates 625B with respect to the already input first touch location 625A that is displayed at the top left of the touchscreen panel 22, as indicated by dark hatchings in FIG. 20C. Accordingly, after displaying the already input (or touched) first touch location 625A on the touch screen panel 22, the control unit may cause the touchscreen panel 22 to display a location, changed from the first touch location 625A to the second location, after displaying the first touch location 625A.

The first touch location may be set to a position (for example, top row of the touchscreen panel 22) where a capturing target of the biometric capturing unit becomes a portion of the palm 100A of the user 100 adjacent to the wrist of the user 100, and the second touch location may be set to a position (for example, bottom row of the touchscreen panel 22) where the capturing target of the biometric capturing unit becomes a portion of the palm 100A of the user 100 adjacent to the fingers of the user 100. In addition, the first touch location may be set to the position (for example, bottom row of the touchscreen panel 22) where the capturing target of the biometric capturing unit becomes the portion of the palm 100A of the user 100 adjacent to the fingers of the user 100, and the second touch location may be set to the position (for example, tom row of the touchscreen panel 22) where the capturing target of the biometric capturing unit becomes the portion of the palm 100A of the user 100 adjacent to the wrist of the user 100.

Next, a description will be given of an example of the operation of the terminal apparatus illustrated in FIG. 19, by referring to FIGS. 21A, 21B, and 21C. FIGS. 21A, 21B, and 21C are diagrams for explaining the example of the operation of the terminal apparatus illustrated in FIG. 19.

FIG. 21A illustrates an input state that occurs when the user 100 touches by the user's fingertip a first touch location 625-1 at the top left of the touchscreen panel 22 in the input standby state in which the control unit displays nine touch locations 625 on the touchscreen panel 22, the control unit thereafter displays second touch location candidates 625B at the top right, bottom left, and bottom right of the touchscreen panel 22, and the user 100 touches by the user's fingertip a second touch location 625-2 at the bottom right of the touchscreen panel 22.

FIG. 21B illustrates an input state that occurs when the user 100 touches by the user's fingertip a second touch location 625-3 at the bottom left of the touchscreen panel 22, in the input state illustrated in FIG. 21A. FIG. 21C illustrates an input state that occurs when the user 100 touches by the user's fingertip a second touch location 625-4 at the top right of the touchscreen panel 22, in the input state illustrated in FIG. 21B.

When the input is made to each of the four touch locations 625-1, 625-2, 625-3, and 625-4 at the top left, the bottom right, the bottom left, and the top right of the touchscreen panel 22, the control unit judges that the sensor part 16 captured the capture area used for the biometric authentication while the input was made, and decides to complete (or end) the biometric imaging process.

When the control unit displays on the touchscreen panel 22, with reference to the already input first touch location, the second touch location candidates that are farthest from the reference (first touch location) in vertical, horizontal, and diagonal directions, the control unit may use a Manhattan distance or Euclidean distance, or the like. In addition, the control unit may display on the touchscreen panel 22, with reference to the already input first touch location, the second touch location candidates that are closest from the reference (first touch location) in vertical, horizontal, and diagonal directions. Accordingly, the second touch location candidates are not limited to the touch locations at the top left, the top right, the bottom left, and the bottom right of the touchscreen panel 22, and may be located at a center row of the touch locations or at a center column of the touch locations, for example. Hence, the sensor part 16 can continuously capture the palm 100A of the user 100 without discontinuity, and the reliability of the capture area can be improved. For this reason, in the case of a biometric authentication process requiring a high authentication accuracy and the already input first touch location is used as the reference, the second touch location candidates are desirably all of the touch locations other than the reference, already input first touch location.

Furthermore, in FIGS. 19 through 21C, different numerals, symbols, or graphics may be displayed at each of the touch locations 625. The arrangement of the numerals, symbols, or graphics displayed at each of the touch locations 625 may be changed every time the registration template is registered into the storage unit 35, or every time the matching is performed by the matching unit 34. For example, the user 100 may memorize the numerals, symbols, or graphics displayed at each of the touch locations 625 at the time of registering the registration template. In this case, at the time of the matching, the user 100 can touch and select the touch locations 625 according to the user's memory of the numerals, symbols, or graphics.

The control unit may use as the reliability of the biometric information the number of touch locations that are already input, instead of using the ratio of the capture area that is captured with respect to the maximum capture area. More particularly, in the case of the tenth example of the touch location, the reliability of the biometric information may be the number of the already input touch locations in FIG. 21C, that is, four. In this case, the touch locations 625-1 through 625-4 at the four corners on the touchscreen panel 22 are the already input touch locations, and the capture area 16A of the sensor part 16 is enlarged to the enlarged capture area 16B. For this reason, the reliability of the captured biometric information is judged to be high.

For example, in a case in which the Manhattan distance is set to 1, and the already input first touch location is used as the reference to determine the second touch location candidates, the reliability of the biometric information may be a state in which the capture area 16A of the sensor part 16 positively overlaps in upper and lower directions, or in right and left directions, when the inputs are made to the mutually adjacent touch locations.

The sequence of the biometric imaging process when displaying the tenth example of the touch location on the touchscreen panel 22 may be the same as the sequence of the biometric imaging process described above in conjunction with FIG. 9. In this case, it is possible to guide the user 100 to perform the operation by the user's finger to touch the touch locations in a sequence on the touchscreen panel 22.

According to each of the embodiments described above, an instruction of an operation position on an operation unit is output, according to detection of an input to the operation unit by the detection unit, and a biometric image is captured by a biometric capturing unit after detection of the input. Hence, it is possible to improve the accuracy of the biometric authentication.

Further, even in a case in which the capture area captured by the biometric capturing unit is small, the embodiments can guide the operator to operate (or touch) the touch location according to the display, so that it is possible to capture the biometric image in an area wider than the angle of view of the biometric capturing unit. In addition, it is possible to guide the user to operate (or touch) the touch location according to the display, in order to positively capture the area of the biometric image that is used for the biometric authentication by the biometric capturing unit. As a result, the biometric capturing unit can stably capture the capture area capable of capturing the biometric image that is used for the biometric authentication, and biometric information having a high reliability can be obtained, by guiding the user to perform a simple operation. Moreover, the authentication accuracy of the biometric authentication process can be improved by using the biometric information having the high reliability.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

Although the examples are numbered with, for example, "first," "second," . . . or "tenth," the ordinal numbers do not imply priorities of the examples. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric imaging device comprising:
  a casing having a surface on which a touchscreen panel is provided;
  a camera, having a fixed capture area, provided on the surface of the casing in a periphery of the touchscreen panel; and
  a processor that performs a process including
    outputting an instruction that instructs an operation position of at least one finger of a user on the touchscreen panel to display the operation position on the touchscreen panel based on the instruction, in response to detection of a first input to the touchscreen panel by one or more fingers of the user; and
    controlling the camera to capture a biometric image of a palm of the user inside the fixed capture area at a timing, after the detection of the first input, when the touchscreen panel detects a second input that is a touch to the operation position displayed on the touchscreen panel by the at least one finger of the user,
  wherein the camera is located at a position on the surface of the casing such that at least a portion of the palm of the user is captured inside the fixed capture area in a state in which the at least one finger of the user touches the operation position displayed on the touchscreen panel.

2. The biometric imaging device as claimed in claim 1, wherein the processor sets the operation position according to a position of the first input on the touchscreen panel.

3. The biometric imaging device as claimed in claim 1, wherein the processor sets the operation position to a position stored in a storage unit.

4. The biometric imaging device as claimed in claim 1, wherein
  the processor causes the touchscreen panel to display a touch location that is to be touched by the user, as the operation position, wherein the touch location is changed from a first touch location corresponding to the first input to a second touch location, after displaying the first touch location.

5. The biometric imaging device as claimed in claim 4,
  wherein the first touch location is set to a position where a first portion of the palm, adjacent to a wrist of the user, is inside the fixed capture area of the camera, and
  wherein the second touch location is set to a position where a second portion of the palm, adjacent to fingers of the user, is inside the fixed capture area of the camera.

6. The biometric imaging device as claimed in claim 4, wherein the first touch location is set to a position where a first portion of the palm, adjacent to fingers of the user, is inside the fixed capture area of the camera, and wherein the second touch location is set to a position where a second portion of the palm, adjacent to a wrist of the user, is inside the fixed capture area of the camera.

7. The biometric imaging device as claimed in claim 4, wherein the processor controls the camera to capture a first biometric image of a first portion of the palm of the user inside the fixed capture area according to detection of a touch to the first touch location, and controls the camera to capture a second biometric image of a second portion of the palm of the user inside the fixed capture area according to detection of a touch to the second touch location.

8. The biometric imaging device as claimed in claim 1, wherein
the processor controls the touchscreen panel to display a move instruction to move a touch location to be touched by the user, as the operating position.

9. The biometric imaging device as claimed in claim 8, wherein the move instruction includes a display of a moving route of the touch location on the touchscreen panel.

10. The biometric imaging device as claimed in claim 8, wherein the move instruction is a slide instruction to move the touch location by sliding two or more fingers of the user on the touchscreen panel.

11. The biometric imaging device as claimed in claim 10, wherein the processor performs a process including
under a condition that an input is made with respect to at least one touch location amongst a plurality of touch locations displayed on the touchscreen panel, updating a touch location for guiding a next touch on the touchscreen panel for all of the plurality of touch locations, and
under a condition that an input is simultaneously made with respect to two or more touch locations amongst the plurality of touch locations displayed on the touchscreen panel, judging a start of capturing the biometric image of the palm of the user by the camera.

12. The biometric imaging device as claimed in claim 8, wherein the move instruction is a slide instruction to move the touch location by sliding at least one finger on the touchscreen panel by at least one of a linear, a Z-shaped, a rectangular shaped, a circular or oval-shaped, and a triangular shaped sliding movement on the touchscreen panel.

13. The biometric imaging device as claimed in claim 1, wherein
the processor controls the touchscreen panel to display a move instruction to move a touch location to be touched by the user, as the operating position, and
the move instruction includes a display of a moving route of the touch location on the touchscreen panel to instruct sliding two or more fingers of the user on the touchscreen panel, so that the camera captures the biometric image of the palm in an area larger than the fixed capture area of the camera as the two or more fingers of the user slide on the touchscreen panel.

14. A terminal apparatus comprising:
the biometric imaging device as claimed in claim 1; and
the touchscreen panel.

15. A biometric imaging method comprising:
detecting, by a touchscreen panel that is provided on a surface of a casing, an input to the touchscreen panel;
outputting, by a processor, an instruction that instructs an operation position of at least one finger of a user on the touchscreen panel to display the operation position on the touchscreen panel based on the instruction, in response to detection of a first input to the touchscreen panel; and
controlling, by the processor, a camera that has a fixed capture area and is provided on the surface of the casing in a periphery of the touchscreen panel, to capture a biometric image of a palm of the user inside the fixed capture area at a timing, after the detection of the first input, when the touchscreen panel detects a second input that is a touch to the operation position displayed on the touchscreen panel by the at least one finger of the user,
wherein the camera is located at a position on the surface of the casing such that at least a portion of the palm of the user is captured inside the fixed capture area in a state in which the at least one finger of the user touches the operation position displayed on the touchscreen panel.

16. The biometric imaging method as claimed in claim 15, further comprising:
setting, by the processor, the operation position according to a position of the first input on the touchscreen panel.

17. The biometric imaging method as claimed in claim 15, further comprising:
controlling the touchscreen panel, by the processor, to display a move instruction to move a touch location to be touched by the user, as the operating position,
wherein the move instruction includes a display of a moving route of the touch location on the touchscreen panel to instruct sliding two or more fingers of the user on the touchscreen panel, so that the camera captures the biometric image of the palm in an area larger than the fixed capture area of the camera as the two or more fingers of the user slide on the touchscreen panel.

18. A non-transitory computer-readable storage medium having stored therein a program for causing a computer to execute a process comprising:
detecting an input to a touchscreen panel that is provided on a surface of a casing;
outputting an instruction that instructs an operation position of at least one finger of a user on the touchscreen panel to display the operation position on the touchscreen panel based on the instruction, in response to detection of a first input to the touchscreen panel by one or more fingers of the user; and
controlling a camera that has a fixed capture area and is provided on the surface of the casing in a periphery of the touchscreen panel, to capture a biometric image of a palm of the user inside the fixed capture area of the camera at a timing, after the detection of the first input, when the touchscreen panel detects a second input that is a touch to the operation position displayed on the touchscreen panel by the at least one finger of the user,
wherein the camera is located at a position on the surface of the casing such that at least a portion of the palm of the user is captured inside the fixed capture area in a state in which the at least one finger of the user touches the operation position displayed on the touchscreen panel.

19. The non-transitory computer-readable storage medium as claimed in claim 18, wherein the process further comprises:
setting the operation position according to a position of the first input on the touchscreen panel.

20. The non-transitory computer-readable storage medium as claimed in claim 18, wherein the process further comprises:
- controlling the touchscreen panel to display a move instruction to move a touch location to be touched by the user, as the operating position,
- wherein the move instruction includes a display of a moving route of the touch location on the touchscreen panel to instruct sliding two or more fingers of the user on the touchscreen panel, so that the camera captures the biometric image of the palm in an area lamer than the fixed capture area of the camera as the two or more fingers of the user slide on the touchscreen panel.

\* \* \* \* \*